(12) United States Patent
Nara

(10) Patent No.: US 12,498,603 B2
(45) Date of Patent: Dec. 16, 2025

(54) PLANAR ILLUMINATION DEVICE

(71) Applicant: MINEBEA MITSUMI Inc., Nagano (JP)

(72) Inventor: Yusuke Nara, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/729,045

(22) PCT Filed: Mar. 16, 2022

(86) PCT No.: PCT/JP2022/011887
§ 371 (c)(1),
(2) Date: Jul. 15, 2024

(87) PCT Pub. No.: WO2023/139802
PCT Pub. Date: Jul. 27, 2023

(65) Prior Publication Data
US 2025/0110369 A1    Apr. 3, 2025

(30) Foreign Application Priority Data
Jan. 19, 2022    (JP) .................................. 2022-006109

(51) Int. Cl.
*G02F 1/13357*    (2006.01)
(52) U.S. Cl.
CPC .. *G02F 1/133605* (2013.01); *G02F 1/133603* (2013.01); *G02F 1/133608* (2013.01)
(58) Field of Classification Search
CPC .................. G02F 1/133602–133611
See application file for complete search history.

(56) References Cited

U.S. PATENT DOCUMENTS

| 7,163,315 B2 * | 1/2007 | Chang ............... G02F 1/133605 |
| | | 362/240 |
| 10,718,487 B2 | 7/2020 | Yamada |
| 11,073,256 B2 | 7/2021 | Yamada |
| | (Continued) | |

FOREIGN PATENT DOCUMENTS

| JP | 11-260122 A | 9/1999 |
| JP | 2011-228231 A | 11/2011 |
| | (Continued) | |

OTHER PUBLICATIONS

International Search Report for corresponding International Application No. PCT/JP2022/011887 mailed May 24, 2022.

(Continued)

*Primary Examiner* — Jason M Han
(74) *Attorney, Agent, or Firm* — Chrisman Gallo Tochtrop LLC

(57) ABSTRACT

The planar illumination device includes a substrate including a plurality of light sources provided at one surface side, and a reflector disposed at the one surface side of the substrate and including a plurality of segments corresponding to the plurality of light sources, respectively, each of the segments being formed with a reflection surface surrounding each of the light sources. In an outer peripheral part segment disposed at an outer peripheral part of the reflector out of the plurality of segments, the reflection surface at an outer side and the reflection surface at an inner side are asymmetric.

16 Claims, 20 Drawing Sheets

(56) References Cited

U.S. PATENT DOCUMENTS

| | | |
|---|---|---|
| 11,892,157 B2 | 2/2024 | Yamada |
| 2012/0147589 A1 | 6/2012 | Farmer |
| 2019/0063723 A1 | 2/2019 | Yamada |
| 2020/0309344 A1 | 10/2020 | Yamada |
| 2021/0317970 A1 | 10/2021 | Yamada |

FOREIGN PATENT DOCUMENTS

| | | |
|---|---|---|
| JP | 2012-204336 A | 10/2012 |
| JP | 2019-046789 A | 3/2019 |

OTHER PUBLICATIONS

Written Opinion for corresponding International Application No. PCT/JP2022/011887 dated May 24, 2022.
Notice of Reasons for Refusal dated Oct. 25, 2022 for corresponding Japanese Application No. 2022-006109 and English translation.
English translation of Written Opinion dated May 24, 2022 for corresponding International Application No. PCT/JP2022/011887.

* cited by examiner

PLANAR ILLUMINATION DEVICE

CROSS REFERENCE TO RELATED APPLICATIONS

This application is a national stage entry of International Application No. PCT/JP2022/011887, filed on Mar. 16, 2022, which claims priority to Japanese Patent Application 2022-006109, filed on Jan. 19, 2022, which is incorporated herein by reference.

TECHNICAL FIELD

The disclosure relates to a planar illumination device.

BACKGROUND

A known so-called direct-type planar illumination device includes a substrate including a plurality of light sources arranged at one surface side and a reflector disposed at the one surface side of the substrate. Such a planar illumination device is used as, for example, a backlight for an on-board liquid crystal display device.

Among such planar illumination devices, there is a planar illumination device including a reflector plate at a circumference of light sources, the reflection plate reflecting light from the light sources (for example, see JP 11-260122 A). In this planar illumination device, the reflector plate is formed in a curved shape in a cross-sectional view including the axes of the light sources in order to improve the utilization efficiency of light from the light sources.

SUMMARY

However, in the above-described planar illumination device, the luminance at an outer peripheral part segment located at an outer peripheral part of the reflector is lower than the luminance at an inner side segment located at an inner side in a longitudinal direction and a lateral direction. Therefore, there is room for improvement in the planar illumination device in the related art in terms of the uniformity of luminance at an emission surface.

The disclosure has been made in view of the above circumferences, and an object is to provide a planar illumination device capable of improving the uniformity of luminance at an emission surface.

In order to solve the above-described problem and achieve the object, a planar illumination device according to an aspect of the disclosure includes: a substrate including a plurality of light sources provided at one surface side; and a reflector disposed at the one surface side of the substrate and including a plurality of segments, each segment of the plurality of segments being corresponding to a respective light source of the plurality of light sources and being formed In an outer peripheral part segment, of the plurality of segments, located at an outer peripheral part of the reflector, the reflection surface at an outer side and the reflection surface at an inner side are asymmetric.

A planar illumination device according to an aspect of the disclosure can improve the uniformity of luminance at an emission surface.

DESCRIPTION OF EMBODIMENTS

First Embodiment

Figure 1:
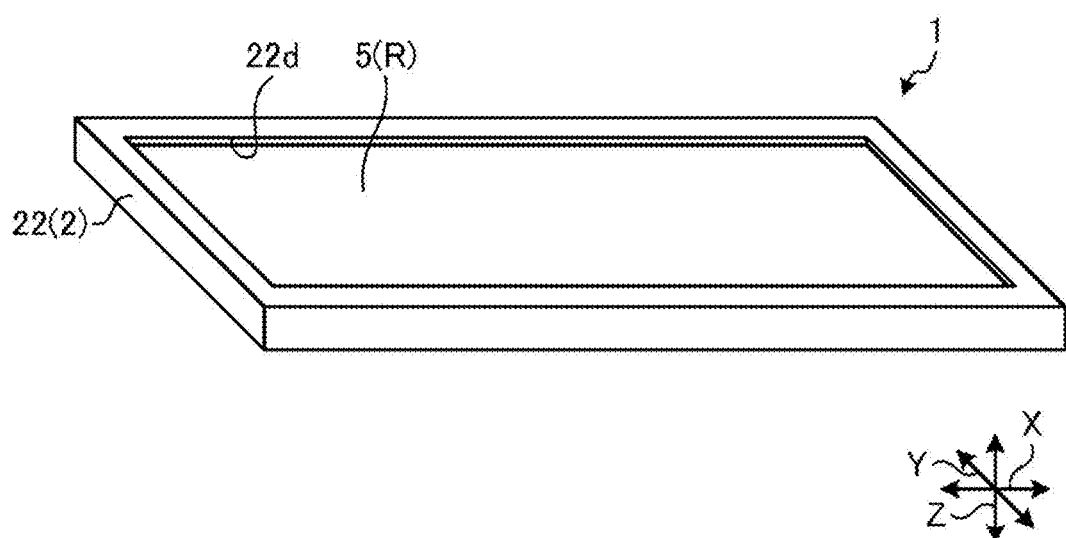
FIG. 1 is a perspective view of a planar illumination device according to a first embodiment.

A planar illumination device 1 according to a first embodiment will be described below with reference to the drawings. Note that the disclosure is not limited by the embodiments described below. The dimensional relationships between elements, the proportions of the elements, and the like in the drawings may differ from reality. The drawings may include portions different in dimensional relationships and proportions from each other. In principle, the contents described in one embodiment are similarly applied other embodiments.

Figure 2:
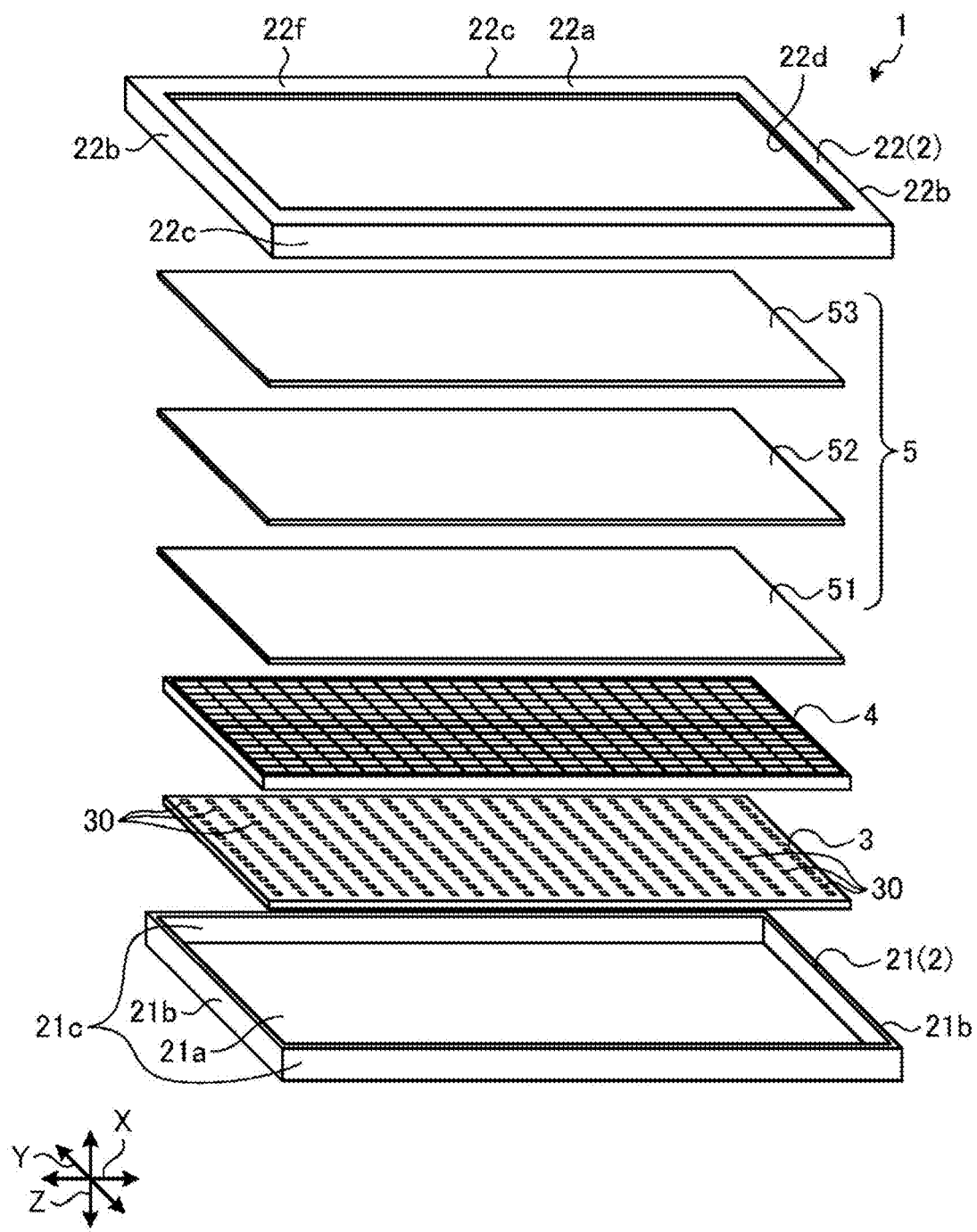
FIG. 2 is an exploded perspective view of the planar illumination device according to the first embodiment.

First, the overall configuration of the planar illumination device 1 according to the embodiment will be described using FIGS. 1 and 2. FIG. 1 is a perspective view of the planar illumination device 1 according to the first embodiment. FIG. 2 is an exploded perspective view of the planar illumination device 1 according to the first embodiment. In FIGS. 1 and 2, for the sake of convenience, a longitudinal direction of the planar illumination device 1 is an X-axis direction, a lateral direction is a Y-axis direction, and a thickness direction is a Z-axis direction. The longitudinal direction is a first direction, and the lateral direction is a second direction. In the thickness direction, a side with an optical sheet 5 disposed with respect to a substrate 3 is referred to as an emission surface side or as one surface side.

The planar illumination device 1 according to the embodiment is an illumination device used as a backlight for various types of liquid crystal display devices, and is a so-called direct-type planar illumination device 1 with a light source 30 to be described below disposed directly below an emission surface R. A liquid crystal display device as a target of the planar illumination device 1 is, for example, a display device such as an electronic meter and an indicator mounted in a vehicle.

As illustrated in FIG. 1, the planar illumination device 1 according to the embodiment includes the emission surface R defined by an opening 22d of a top frame 22 to be described below. The planar illumination device 1 emits light from the emission surface R and functions as a backlight for the liquid crystal display device described above. Further, the emission surface R of the planar illumination device 1 according to the present embodiment is a flat surface orthogonal to the thickness direction.

As illustrated in FIG. 2, the planar illumination device 1 according to the embodiment includes a frame 2, the substrate 3, a reflector 4, and the optical sheet 5.

The frame 2 is, for example, a housing made of stainless steel having high rigidity. Note that the frame 2 may be formed of aluminum, magnesium, or the like. The planar illumination device 1 according to the present embodiment is formed in, for example, a rectangular parallelepiped shape and has a rectangular shape in a front view. Note that the shape of the planar illumination device 1 is not limited to this shape, and may be formed in a different shape. The frame 2 includes a bottom frame 21 and a top frame 22. The substrate 3, the reflector 4, and the optical sheet 5 are housed in an internal space 2s (see FIG. 4) formed by the bottom frame 21 and the top frame 22.

The bottom frame 21 is formed in a bottomed box shape, and functions as a base of the frame 2. Further, the bottom frame 21 includes a bottom part 21a, a pair of first side walls 21b, and a pair of second side walls 21c. The bottom part 21a has a rectangular shape when viewed from one side in the thickness direction, and defines a front view shape of the planar illumination device 1. The pair of first side walls 21b oppose each other in the longitudinal direction and are continuous in the lateral direction. The pair of second side walls 21c oppose each other in the lateral direction and are continuous in the longitudinal direction.

The top frame 22 is disposed at one surface side of the bottom frame 21 in the thickness direction, and functions as a lid of the frame 2. In addition, the top frame 22 may be made of resin. Further, the top frame 22 includes a top plate 22a, a pair of first side walls 22b, and a pair of second side walls 22c. The opening 22d is formed at a center part of the top plate 22a, and the emission surface R described above is defined by the opening 22d. In other words, the top frame 22 includes a frame edge part 22f formed with the opening 22d at an inner side. In addition, the emission surface R of the planar illumination device 1 according to the present embodiment is formed in a flat surface, but may be formed in a curved surface. The pair of first side walls 22b oppose each other in the longitudinal direction and are continuous in the lateral direction. The pair of second side walls 22c face each other in the lateral direction and are continuous in the longitudinal direction. Then, in a state of the top frame 22 being fitted to the bottom frame 21, the internal space 2s is formed in the frame 2 (see FIG. 4). Although the top frame 22 of the planar illumination device 1 according to the present embodiment has been described as including the pair of first side walls 22b and the pair of second side walls 22c, the top frame 22 may not include the first side walls 22b and the second side walls 22c.

The substrate 3 is a circuit board made of, for example, epoxy resin or polyimide (PI) and, for example, a flexible printed circuit (FPC) board can be employed. The substrate 3 is provided at the one surface of the bottom frame 21 in the thickness direction. In other words, the planar illumination device 1 includes the bottom frame 21 provided at a side opposite to one surface of the substrate 3. Further, a plurality of light sources 30 is provided at the one surface side of the substrate 3. In other words, the planar illumination device 1 includes the substrate 3 with the plurality of light sources 30 provided at the one surface side.

Figure 4:
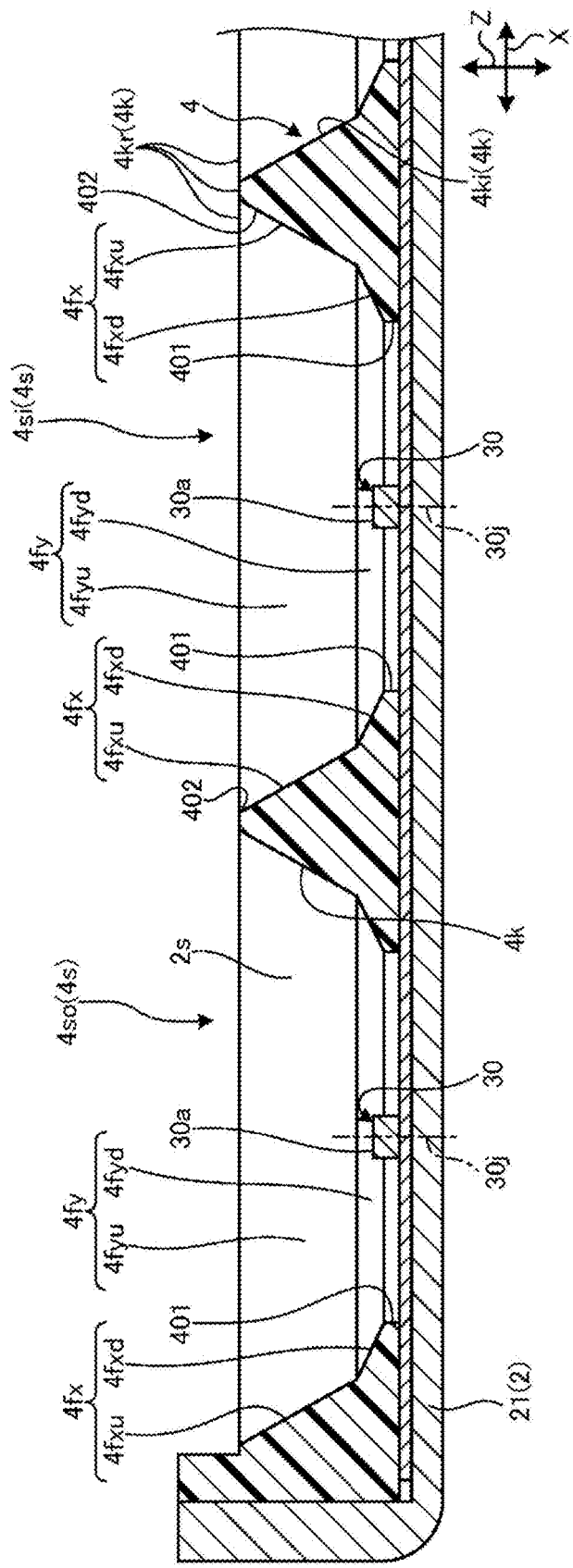
FIG. 4 is a cross-sectional view of the substrate and the reflector of the planar illumination device according to the first embodiment, taken along the arrow IV in FIG. 3.
Figure 5:
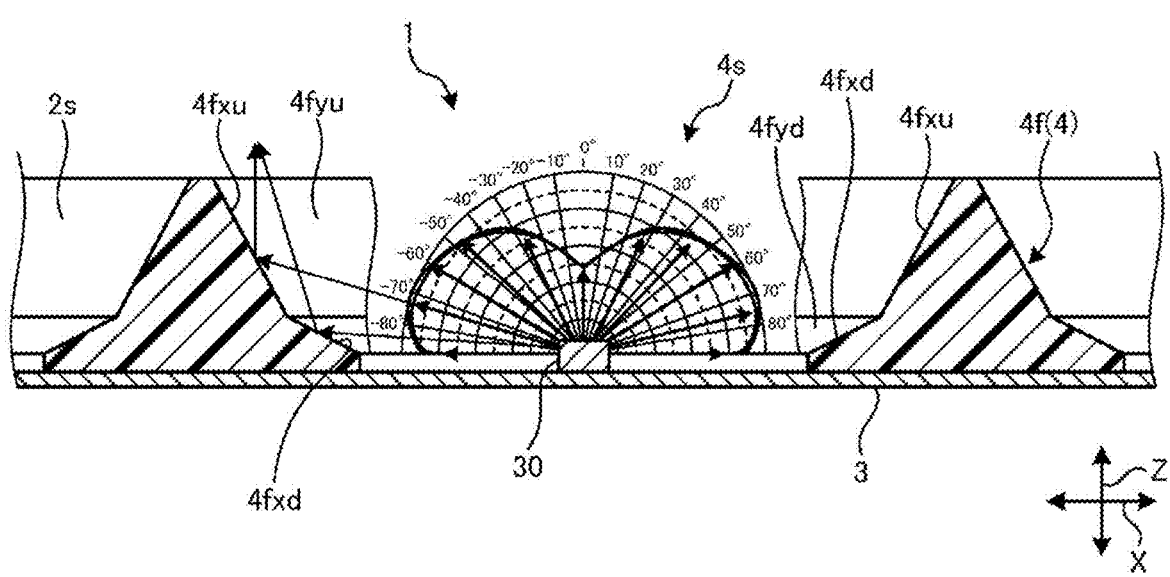
FIG. 5 is a cross-sectional view illustrating an effect of the planar illumination device according to the first embodiment.

The light source 30 is a point light source and, for example, a light emitting diode (LED) can be employed. As the light source 30, for example, a package-type LED or a chip-type LED can be used, but the light source 30 is not limited to these types. The light source 30 emits light. Note that the light source 30 is not limited to an LED, and any light-emitting member can be employed. As the light source 30, for example, a light source having a so-called batwing light distribution can be employed (FIG. 5). In the batwing light distribution, the amount of light in a direction inclined from an optical axis 30j is made larger than the amount of light in an optical axis direction of the light source 30 in order to reduce the thickness of the device (reduce a distance between the light source 30 and the optical sheet 5 in the thickness direction). In FIG. 5, the direction (optical axis direction) of the optical axis 30j (see FIG. 4) of the light source 30 is set to 0 degrees, and each angle illustrated in FIG. 5 indicates a deviation from the optical axis direction. Then, the lengths of the arrows from the light source 30 in FIG. 5 indicate the magnitudes of the amounts of light.

The light sources 30 of the planar illumination device 1 according to the present embodiment are arranged, for example, at a certain pitch along the longitudinal direction (first direction) and arranged at a certain pitch in the lateral direction (second direction). That is, the light sources 30 of the planar illumination device 1 according to the present embodiment are disposed in a lattice pattern at equal intervals longitudinally and laterally. As for the plurality of light sources 30 according to the present embodiment, the amount of light emitted from each of the light sources 30 is the same.

The reflector 4 is formed of, for example, synthetic resin, has a function of reflecting the light emitted from the light sources 30 to the emission surface side and increasing the luminance of the emission surface R, and can improve an emission efficiency of the planar illumination device 1. The reflector 4 is disposed at the one surface side of the substrate 3 in the thickness direction. In other words, the planar illumination device 1 includes the reflector 4 provided at the one surface side of the substrate 3. The reflector 4 according to the present embodiment is integrally formed by, for example, injection molding synthetic resin. That is, the planar illumination device 1 of the present embodiment includes one reflector 4.

Figure 3:
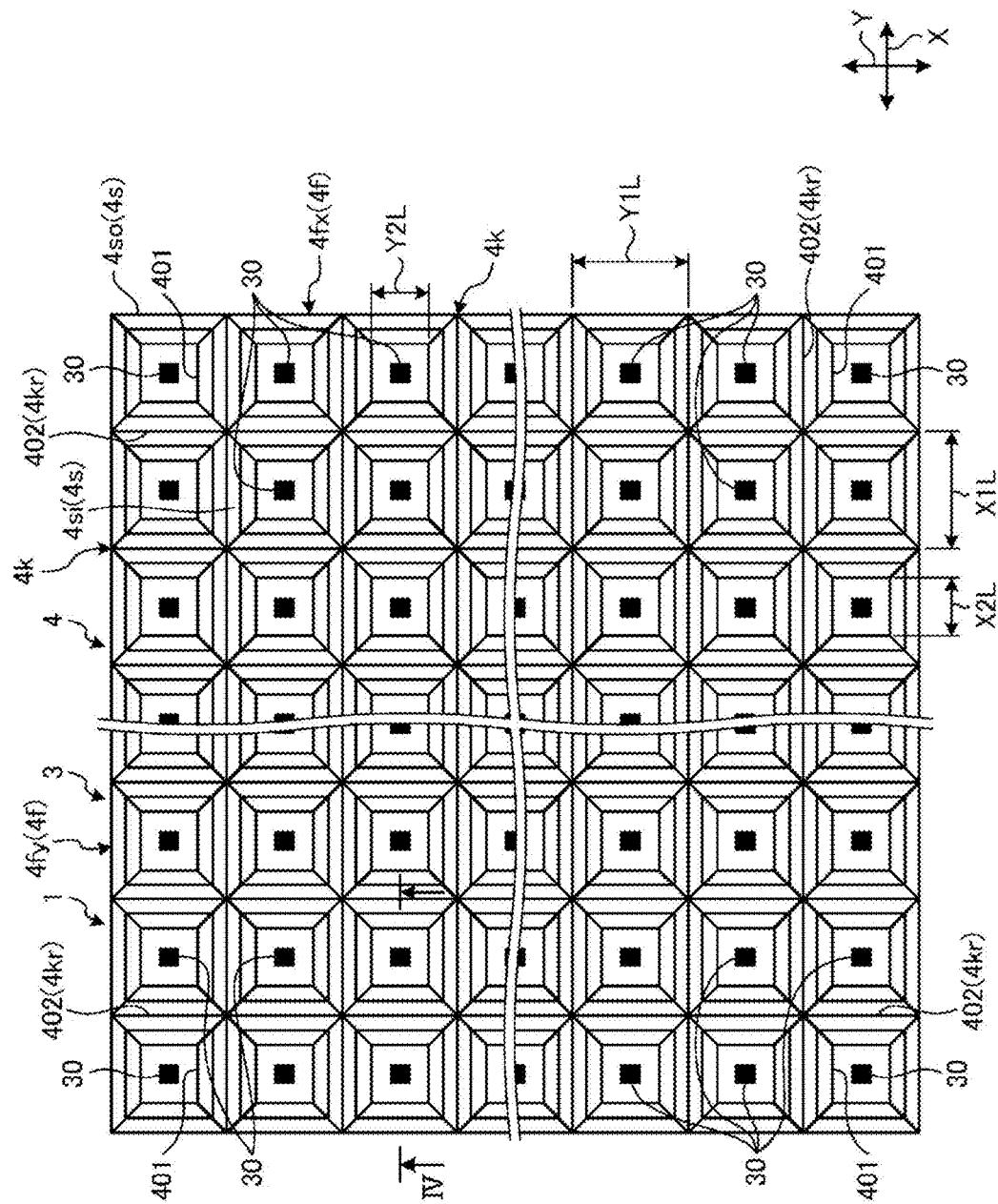
FIG. 3 is a plan view of a substrate and a reflector of the planar illumination device according to the first embodiment.

FIG. 3 is a plan view of the substrate 3 and the reflector 4 of the planar illumination device according to the first embodiment. FIG. 4 is a cross-sectional view of the substrate 3 and the reflector 4 of the planar illumination device 1 according to the first embodiment, taken along the arrow IV in FIG. 3. As illustrated in FIGS. 3 and 4, the reflector 4 is formed with segments 4s respectively corresponding to the plurality of light sources 30 mounted at the substrate 3. The segment 4s includes a partition wall 4k surrounding the light source 30. That is, the reflector 4 includes the partition walls 4k formed such that openings respectively corresponding to the plurality of light sources 30 are arranged in a lattice pattern. The partition walls 4k are formed in a shape obtained by assembling a plurality of partition walls 4k extending in the longitudinal direction and a plurality of partition walls 4k extending in the lateral direction in a lattice pattern. The segment 4s is defined by the partition wall 4k surrounding the light source 30.

The partition wall 4k is formed so as to be wide at the substrate 3 side and gradually become narrower toward the emission surface side in the thickness direction, and has a ridge line 4kr at an end part at the emission surface side. In the reflector 4 according to the present embodiment, the partition walls 4k have the same height in the thickness direction. Further, the reflector 4 is formed with first openings 401 being openings located at the substrate side and second openings 402 being openings located at the emission surface side in the thickness direction. That is, the segment 4s corresponding to one light source 30 is formed with the first opening 401 being an opening located at the substrate side and the second opening (emission surface side opening) 402 being an opening located at the emission surface side in the thickness direction. For example, head parts 30a of the light sources 30 are inserted into the first openings 401, respectively. Note that the head parts 30a of the light sources 30 are not necessarily inserted into the first openings 401, and the first openings 401 may be located above the head parts 30a in the thickness direction. A side surface of the partition wall 4k is a reflection surface 4f surrounding the light source 30. That is, the segment 4s corresponding to one light source 30 is formed with the reflection surface 4f surrounding the one light source 30.

As illustrated in FIG. 3, the reflection surface 4f includes a pair of first reflection surfaces 4fx opposing each other across the light source 30 in the longitudinal direction (first direction) and a pair of second reflection surfaces 4fy opposing each other across the light source 30 in the lateral direction (second direction). That is, the segment 4s includes the pair of first reflection surfaces 4fx opposing each other in the longitudinal direction (first direction) and the pair of second reflection surfaces 4fy opposing each other in the lateral direction (second direction).

The first reflection surface 4fx includes a substrate side reflection surface 4fxd formed at the substrate 3 side and an emission surface side reflection surface 4fxu formed at the emission surface side in the vertical direction.

The substrate side reflection surface 4fxd is located adjacent to the light source 30 in the longitudinal direction (first direction). The emission surface side reflection surface 4fxu is located farther away from the light source 30 than the substrate side reflection surface 4fxd in the longitudinal direction (first direction).

An intersection angle between the emission surface side reflection surface 4fxu and the substrate 3 is larger than an intersection angle between the substrate side reflection surface 4fxd and the substrate 3. More specifically, the intersection angle between the emission surface side reflection surface 4fxu and a surface of the substrate 3 at the emission surface side is larger than the intersection angle between the substrate side reflection surface 4fxd and the surface of the substrate 3 at the emission surface side. In the following description, although the intersection angle between the reflection surface 4f and the substrate 3 is the intersection angle between the reflection surface 4f and the surface of the substrate 3 at the emission surface side as in the description above, this description is omitted to avoid repetition.

The second reflection surface 4fy includes a substrate side reflection surface 4fyd formed at the substrate 3 side and an emission surface side reflection surface 4fyu formed at the emission surface side in the vertical direction.

The substrate side reflection surface 4fyd is located adjacent to the light source 30 in the lateral direction (second direction). The emission surface side reflection surface 4fyu is located farther away from the light source 30 than the substrate side reflection surface 4fyd in the lateral direction (second direction).

An intersection angle between the emission surface side reflection surface 4fyu and the substrate 3 is larger than an intersection angle between the substrate side reflection surface 4fyd and the substrate 3.

In the planar illumination device 1 according to the present embodiment, the intersection angle of the emission surface side reflection surface 4fxu with respect to the substrate 3 is equal to the intersection angle of the emission surface side reflection surface 4fyu with respect to the substrate 3. The intersection angles between the emission surface side reflection surface 4fxu and the substrate 3 and between the emission surface side reflection surface 4fyu and the substrate 3 are, for example, 50 to 75 degrees. Note that, in the planar illumination device 1 according to the present embodiment, the intersection angle of the emission surface side reflection surface 4fxu with respect to the substrate 3 and the intersection angle of the emission surface side reflection surface 4fyu with respect to the substrate 3 are not limited to being equal to each other, but may differ from each other. For example, when the length in the longitudinal direction and the length in the lateral direction of the planar illumination device 1 differ from each other, the intersection angle of the emission surface side reflection surface 4fxu with respect to the substrate 3 and the intersection angle of the emission surface side reflection surface 4fyu with respect to the substrate 3 differ from each other.

In the planar illumination device 1 according to the present embodiment, the intersection angle of the substrate side reflection surface 4fxd with respect to the substrate 3 is equal to the intersection angle of the substrate side reflection surface 4fyd with respect to the substrate 3. The intersection angles between the substrate side reflection surface 4fxd and the substrate 3 and between the substrate side reflection surface 4fyd and the substrate 3 are, for example, 15 to 50 degrees. Note that, in the planar illumination device 1 according to the present embodiment, the intersection angle of the substrate side reflection surface 4fxd with respect to the substrate 3 and the intersection angle of the substrate side reflection surface 4fyd with respect to the substrate 3 are not limited to being equal to each other, but may differ from each other.

That is, the intersection angle between the emission surface side reflection surface 4fyu and the substrate 3 is larger than the intersection angle between the substrate side reflection surface 4fyd and the substrate 3. Further, the intersection angle between the emission surface side reflection surface 4fxu and the substrate 3 is larger than the intersection angle between the substrate side reflection surface 4fxd and the substrate 3. For example, while the intersection angle of the emission surface side reflection surface 4fxu with respect to the substrate 3 is 55 degrees, the intersection angle of the substrate side reflection surface 4fxd with respect to the substrate 3 is 45 degrees.

Note that, among the plurality of segments 4s, the segment 4s disposed at an outer peripheral part of the reflector 4 is referred to as an outer peripheral part segment 4so. Further, among the plurality of segments 4s, the segment 4s disposed at an inner side of the outer peripheral part segment 4so in the longitudinal direction (first direction) and the lateral direction (second direction) is referred to as an inner side segment 4si.

In the present embodiment, lengths XIL of the respective segments 4s in the longitudinal direction (first direction) are the same, and lengths YIL of the respective segments 4s in the lateral direction (second direction) are the same. Thus, the areas of the respective segments 4s (i.e., the second openings 402) are the same.

In the present embodiment, lengths X2L of the first openings 401 of the respective segments 4s in the longitudinal direction (first direction) are the same, and lengths Y2L of the first openings 401 of the respective segments 4s in the lateral direction (second direction) are the same. Thus, the areas of the first openings 401 of the respective segments 4s are the same.

The optical sheet 5 is disposed at one surface side of the reflector 4 in the thickness direction, as illustrated in FIGS. 1 and 2. The planar illumination device 1 of the present embodiment includes, for example, three optical sheets 51, 52, and 53. The optical sheet 5 adjusts the distribution and the luminance of light passing from the other surface side to the one surface side in the thickness direction, and uniformizes the light emitted from the emission surface R, for example. For example, the optical sheet 51 is a diffusion sheet, the optical sheet 52 is a prism sheet, a brightness enhancement film (BEF), or the like, and the optical sheet 53 is a reflective polarization film or a dual brightness enhancement film (DBEF).

The planar illumination device 1 according to the present embodiment has the following configuration in order to enhance the overall uniformity of luminance at the emission surface R.

The reflection surface 4f of the reflector 4 according to the planar illumination device 1 according to the present embodiment includes the substrate side reflection surfaces 4fxd and 4fyd formed at the substrate side and the emission surface side reflection surfaces 4fxu and 4fyu formed at the emission surface side. In addition, the intersection angles between the emission surface side reflection surface 4fxu and the substrate 3 and between the emission surface side reflection surface 4fyu and the substrate 3 are larger than the intersection angles between the substrate side reflection surface 4fxd and the substrate 3 and between the substrate side reflection surface 4fyd and the substrate 3. Thus, as illustrated in FIG. 5, light reflected by the emission surface side reflection surfaces 4fxu and 4fyu located farther from the light source 30 can be emitted in a rising direction steeper than light reflected by the substrate side reflection surfaces 4fxd and 4fyd located closer to the light source 30. Further, by adjusting the intersection angles of the reflection surfaces at the substrate side reflection surfaces 4fxd and 4fyd and the emission surface side reflection surfaces 4fxu and 4fyu, for example, both the light emitted from the light source 30 and reflected by the emission surface side reflection surfaces 4fxu and 4fyu and the light emitted from the light source 30 and reflected by the substrate side reflection surfaces 4fxd and 4fyd can be emitted from the second opening 402 of the reflection surface covering the light source 30. Since the intersection angles are adjusted in this way, particularly when the light source 30 having a batwing light distribution is used, the luminance at the vicinity immediately above the light source 30 and the luminance around the second opening 402 can be uniformized as compared with the case of a first comparative example (modification example) illustrated in FIG. 6, the first comparative example being configured such that a reflection surface includes only an emission surface side reflection surface. That is, as illustrated in FIG. 5, in the case of using the light source 30 having a light distribution with the larger amount of light in a direction inclined from the optical axis 30*j* than in the optical axis direction, the luminance at the vicinity immediately above the light source 30 and the luminance around the second opening 402 can be uniformized as compared with the first comparative example. FIG. 5 is a cross-sectional view illustrating an effect of the planar illumination device according to the first embodiment.

First Comparative Example

Figure 6:
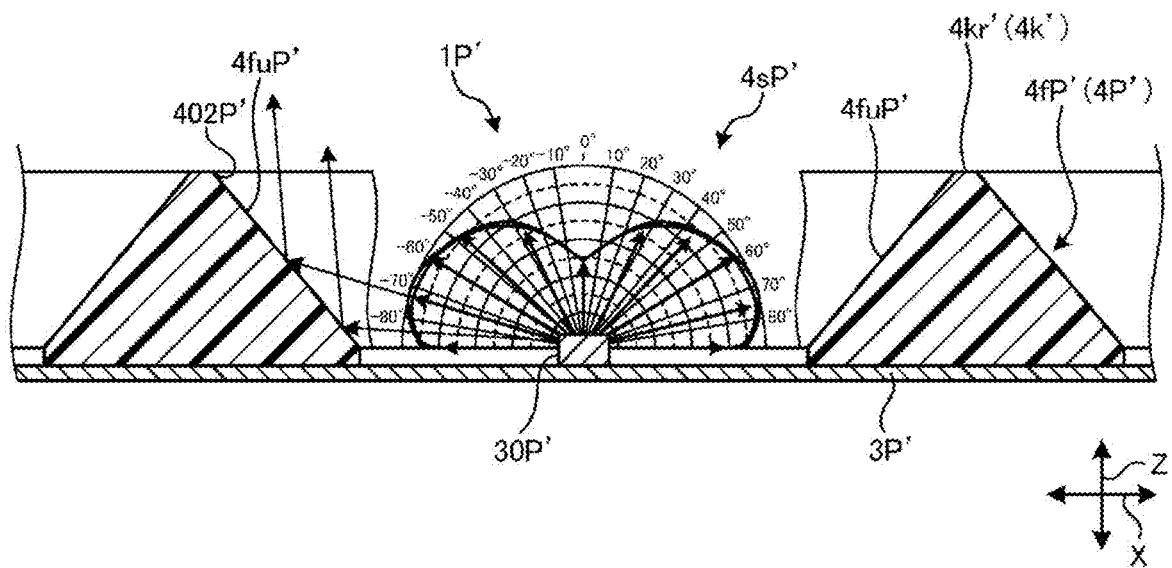
FIG. 6 is a cross-sectional view illustrating an effect of a planar illumination device of a first comparative example.

FIG. 6 is a cross-sectional view illustrating an effect of a planar illumination device of a first comparative example. A planar illumination device 1P' illustrated as the first comparative example is of a direct type. The planar illumination device 1P' includes a substrate 3P' including at least a plurality of light sources 30P' provided at one surface side, and a reflector 4P' disposed at the one surface side of the substrate 3P' and including a plurality of segments 4*s*P' corresponding to the plurality of light sources 30P', respectively, each of the segments 4*s*P' being formed with a reflection surface 4*f*P' surrounding each of the light sources 30P'. The reflector 4P' of the planar illumination device 1P' includes only an emission surface side reflection surface 4*fu*P' having a relatively large intersection angle with respect to the substrate 3P'.

Since the planar illumination device 1P' includes the reflector 4P' provided with the reflection surface 4*f*P' including only the emission surface side reflection surface 4*fu*P' having a relatively large intersection angle with respect to the substrate 3P', when the light source 30P' having a batwing light distribution is used, the luminance at the vicinity immediately above the light source 30P' is high, but the luminance at the vicinity of a second opening 402P' cannot be made high. Accordingly, there is ununiformity in light and dark between the luminance at the vicinity immediately above the light source 30P' and the luminance around the second opening 402P', and thus the luminance at the emission surface R cannot be uniformized. In particular, in the planar illumination device 1P', the luminance at the vicinity immediately above a partition wall 4*k*' is low, and a difference between a low-luminance portion along a ridge line 4*kr*' of the partition wall 4*k*' and a high-luminance portion immediately above the light source 30P' is large.

According to the planar illumination device 1 according to the present embodiment, the uniformity of luminance at the emission surface R can be enhanced by adjusting the intersection angles as described above as compared to the first comparative example.

Figure 7:
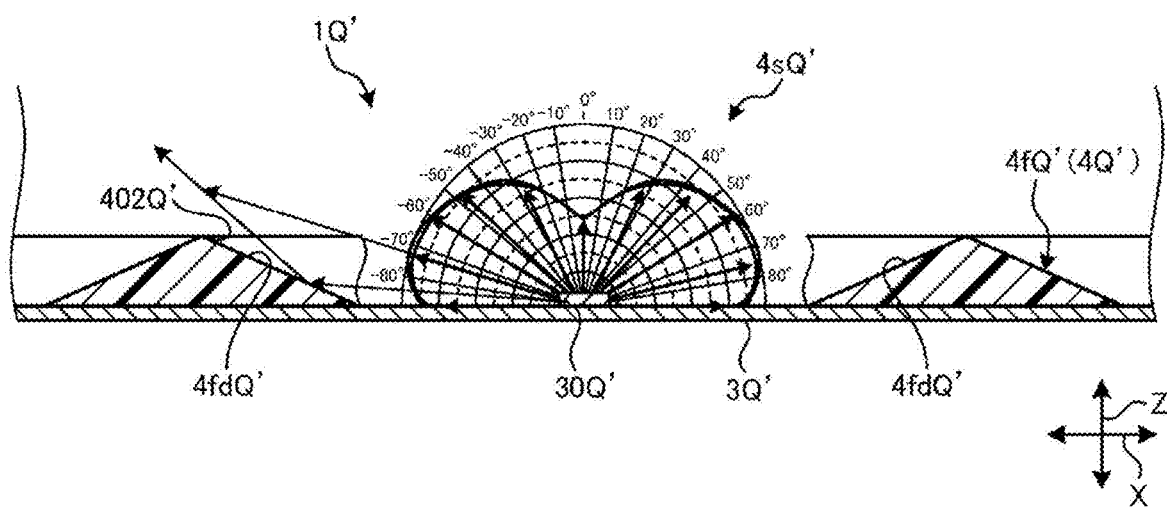
FIG. 7 is a cross-sectional view illustrating an effect of a planar illumination device of a second comparative example.

In addition, the planar illumination device 1 according to the present embodiment can cause light from the light source 30 to be emitted so as not to spread from the second opening 402 of the corresponding reflection surface 4*f*, as compared with a reflection part including a reflection surface composed of only a substrate side reflection surface as in a second comparative example (modification example) illustrated in FIG. 7.

Second Comparative Example

FIG. 7 is a cross-sectional view illustrating an effect of a planar illumination device of a second comparative example. A planar illumination device 1Q' illustrated as the second comparative example is of a direct type. The planar illumination device 1Q' includes a substrate 3Q' including at least a plurality of light sources 30Q' provided at one surface side, and a reflector 4Q' disposed at the one surface side of the substrate 3Q' and including a plurality of segments 4*s*Q' corresponding to the plurality of light sources 30Q', respectively, each of the segments 4*s*Q' being formed with a reflection surface 4*f*Q' surrounding each of the light sources 30Q'. The reflector 4Q' in the planar illumination device 1Q' includes only a substrate side reflection surface 4*fd*Q' having a relatively small intersection angle with respect to the substrate 3Q'.

Since the planar illumination device 1Q' includes the reflector 4Q' provided with the reflection surface 4*f*Q' including only the substrate side reflection surface 4*fd*Q' having a relatively small intersection angle with respect to the substrate 3Q', when the light source 30Q' having a batwing light distribution is used, the light emitted from the light source 30Q' spreads from a second opening 402Q' of the corresponding segment 4*s*Q', and thus a contrast at the time of local dimming cannot be improved.

According to the planar illumination device 1 according to the present embodiment, the contrast at the time of local dimming can be improved by applying the above-described configuration to the light source 30 having a batwing light distribution, as compared with the second comparative example.

As described above, according to the planar illumination device 1 according to the present embodiment, the contrast at the time of local dimming and the uniformity of luminance can be improved, in particular, when the light source 30 having a batwing light distribution is used as the light source 30 in order to reduce the thickness of the device.

However, in a direct backlight such as the planar illumination device 1, there is still a factor for the reduction in the uniformity of luminance. That is, the amount of light entering from the surrounding segments 4*s* is smaller at the outer peripheral part segment 4*so* than at the inner side segment 4*si*. Thus, the luminance is lower at the outer peripheral part segment 4*so* than at the inner side segment 4*si*. As a result, in particular, the luminance at the vicinity of the opening 22*d* is not increased, constituting a factor for the reduction in the uniformity of luminance of the direct backlight. In a second and subsequent embodiments below, structures for eliminating such reduction in luminance will be described.

Second Embodiment

Figure 8:
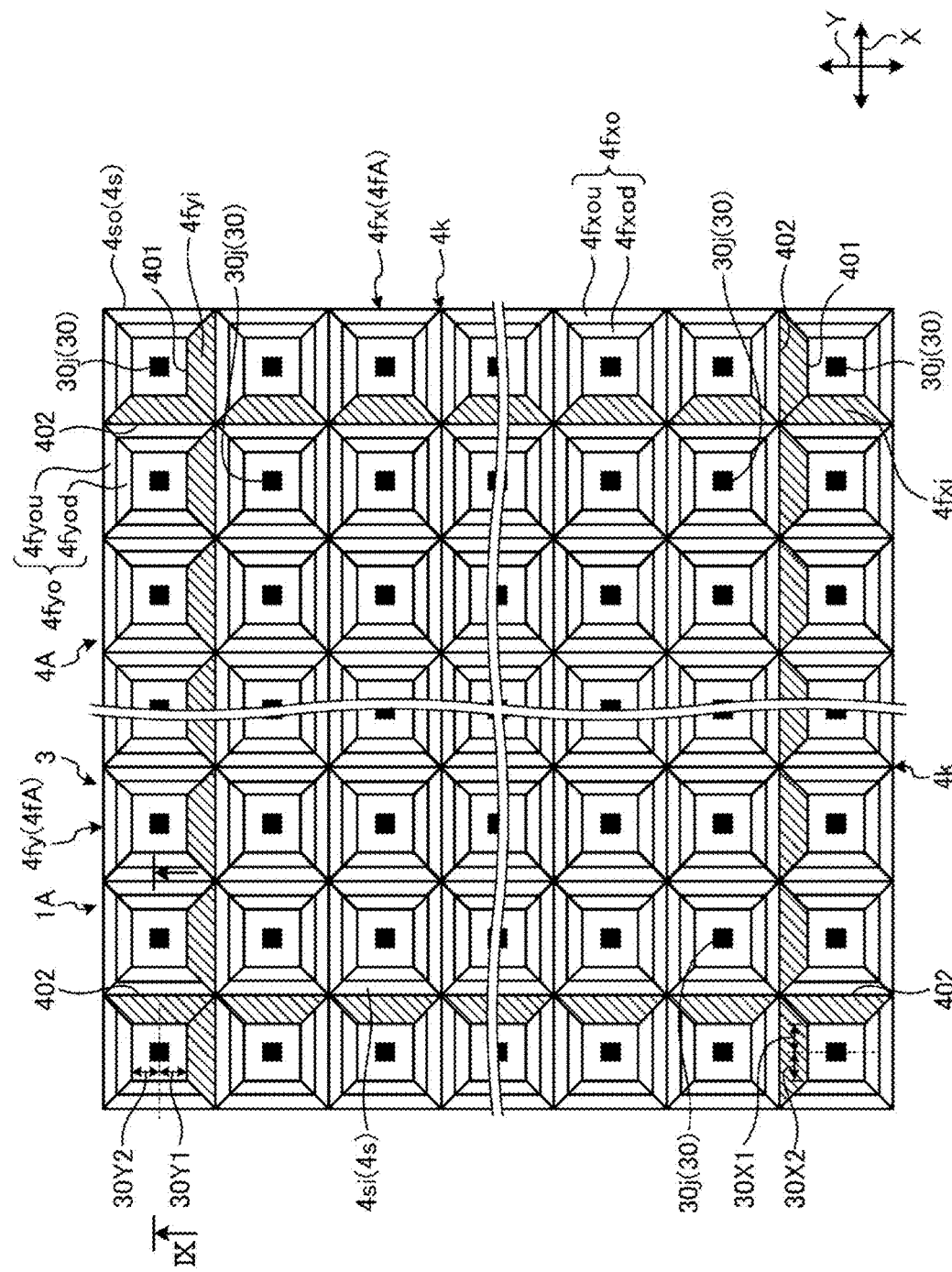
FIG. 8 is a plan view of a substrate and a reflector of a planar illumination device according to a second embodiment.
Figure 9:
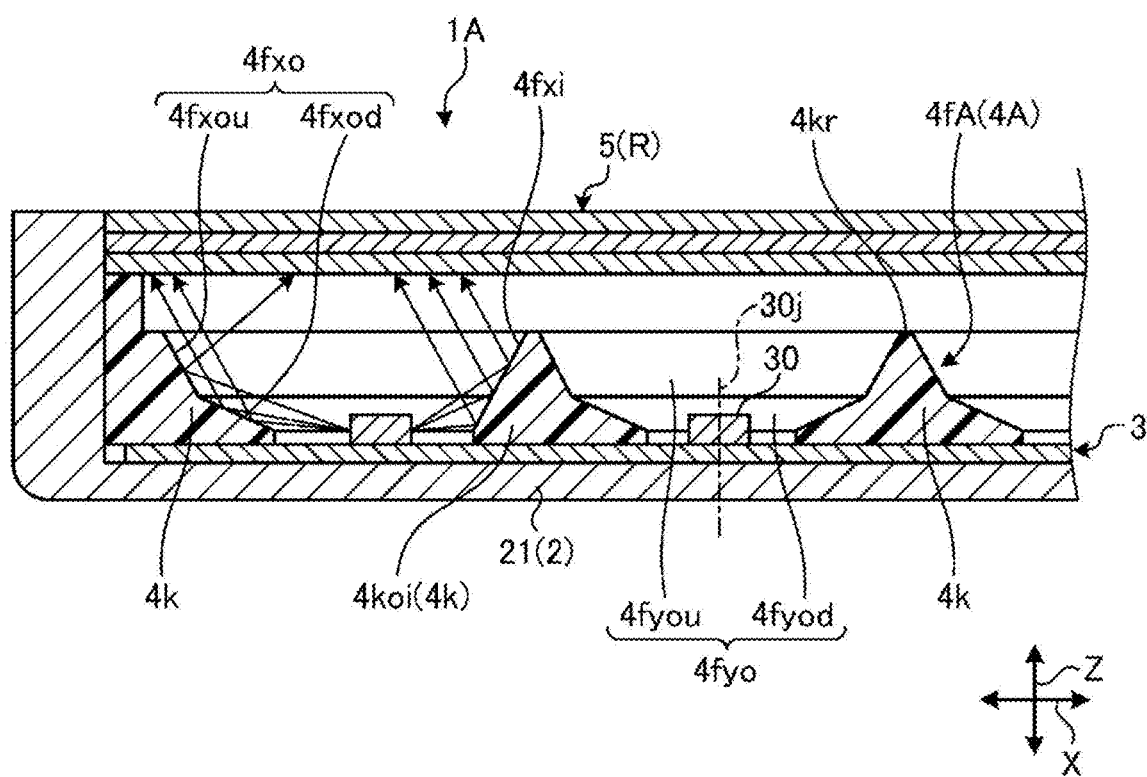
FIG. 9 is a cross-sectional view of the substrate and the reflector of the planar illumination device according to the second embodiment, taken along the arrow IX in FIG. 8.

FIG. 8 is a plan view of the substrate 3 and a reflector 4A of a planar illumination device 1A according to a second embodiment. FIG. 9 is a cross-sectional view of the substrate 3 and the reflector 4A of the planar illumination device 1A according to the second embodiment, taken along the arrow IX in FIG. 8. For the outer peripheral part segments 4*so* illustrated in FIG. 8, as will be described below, reflection surfaces 4*fxi* and 4*fyi* at an inner side composed of a single-step reflection surface are hatched so as to clearly indicate the reflection surfaces 4*fxi* and 4*fyi*. The planar illumination device 1A according to the second embodiment illustrated in FIGS. 8 and 9 and described below includes a reflection surface 4*f*A different from the reflection surface 4*f* of the planar illumination device 1 according to the first embodiment. More specifically, the reflection surface 4*f*A at the outer peripheral part segment 4*so* according to the present embodiment is different from the reflection surface 4*f* at the outer peripheral part segment 4*so* according to the first embodiment. On the other hand, the reflection surface 4*f*A at the inner side segment 4*si* according to the present embodiment is the same as the reflection surface 4*f* at the inner side segment 4*si* according to the first embodiment. Hereinafter, the reflection surfaces 4*f*A at four corners located at both ends in the longitudinal direction and at both ends in the lateral direction of the outer peripheral part segments 4*so* in the planar illumination device 1A according to the second embodiment will be described in detail.

Similar to the reflection surface 4*f* according to the planar illumination device 1 according to the first embodiment, each of the reflection surfaces 4*f*A includes a pair of first reflection surfaces 4*fx* and a pair of second reflection surfaces 4*fy*. Of the pair of first reflection surfaces 4*fx* of the outer peripheral part segment 4*so* according to the present embodiment, the reflection surface at an outer side is referred to as a first reflection surface 4*fxo*, and the reflection surface at an inner side is referred to as a first reflection surface 4*fxi*. Then, an emission surface side reflection surface 4*fxu* of the first reflection surface 4*fxo* is referred to as an emission surface side reflection surface 4*fxo*u, and a substrate side reflection surface 4*fxd* of the first reflection surface 4*fxo* is referred to as a substrate side reflection surface 4*fxo*d. An intersection angle of the substrate 3 with respect to the emission surface side reflection surface 4*fxo*u is larger than an intersection angle of the substrate 3 with respect to the substrate side reflection surface 4*fxo*d. The reflection surface 4*fxi* at the inner side is formed to have a constant intersection angle with respect to the substrate 3. Then, the intersection angle of the substrate 3 with respect to the reflection surface 4*fxi* at the inner side is larger than the intersection angle of the substrate 3 with respect to the substrate side reflection surface 4*fxo*d at the outer side.

Of the pair of second reflection surfaces 4*fy* of the outer peripheral part segment 4*so* according to the present embodiment, the reflection surface at an outer side is referred to as a second reflection surface 4*fyo*, and the reflection surface at an inner side is referred to as a second reflection surface 4*fyi*. Then, an emission surface side reflection surface 4*fyu* of the second reflection surface 4*fyo* is referred to as an emission surface side reflection surface 4*fyo*u, and a substrate side reflection surface 4*fyd* of the second reflection surface 4*fyo* is referred to as a substrate side reflection surface 4*fyo*d. An intersection angle of the substrate 3 with respect to the emission surface side reflection surface 4*fyo*u is larger than an intersection angle of the substrate 3 with respect to the substrate side reflection surface 4*fyo*d. The reflection surface 4*fyi* at the inner side is formed to have a constant intersection angle with respect to the substrate 3. Then, the intersection angle of the substrate 3 with respect to the reflection surface 4*fyi* at the inner side is larger than the intersection angle of the substrate 3 with respect to the substrate side reflection surface 4*fyo*d at the outer side.

In addition, at the outer peripheral part segments 4*so* located between the four corners in the lateral direction and located at both ends in the longitudinal direction, the intersection angle of the substrate 3 with respect to the reflection surface 4*fxi* at the inner side is larger than the intersection angle of the substrate 3 with respect to the substrate side reflection surface 4*fxo*d at the outer side. Further, at the above-described outer peripheral part segments 4*so*, the pair of second reflection surfaces 4*fy* opposing each other in the lateral direction can be appropriately changed as necessary.

Similarly, at the outer peripheral part segments 4*so* located between the outer peripheral part segments 4*so* at the four corners in the longitudinal direction and located at both ends in the lateral direction, the intersection angle of the substrate 3 with respect to the reflection surface 4*fyi* at the inner side is larger than the intersection angle of the substrate 3 with respect to the substrate side reflection surface 4*fyo*d at the outer side. Further, at the above-described outer peripheral part segments 4*so*, the pair of first reflection surfaces 4*fx* opposing each other in the longitudinal direction can be appropriately changed as necessary.

The reflection surfaces 4*f*A of the outer peripheral part segments 4*so* according to the present embodiment are formed line-symmetrically with respect to a center line of the reflector 4A in the longitudinal direction and is formed line-symmetrically with respect to a center line of the reflector 4A in the lateral direction.

In the longitudinal direction (first direction) of the planar illumination device 1A according to the present embodiment, a length 30X1 (see FIG. 8) between the light source 30 and an inner edge of the reflection surface 4*fxi* forming the first opening 401 is substantially equal to or slightly different from a length 30X2 between the light source 30 and an inner edge of the reflection surface 4*fxo* forming the first opening 401.

Further, in the lateral direction (second direction) of the planar illumination device 1A according to the present embodiment, a length 30Y1 between the light source 30 and an inner edge of the reflection surface 4*fyi* forming the first opening 401 is substantially equal to or slightly different from a length 30Y2 between the light source 30 and an inner edge of the reflection surface 4*fyo* forming the first opening 401.

Figure 10:
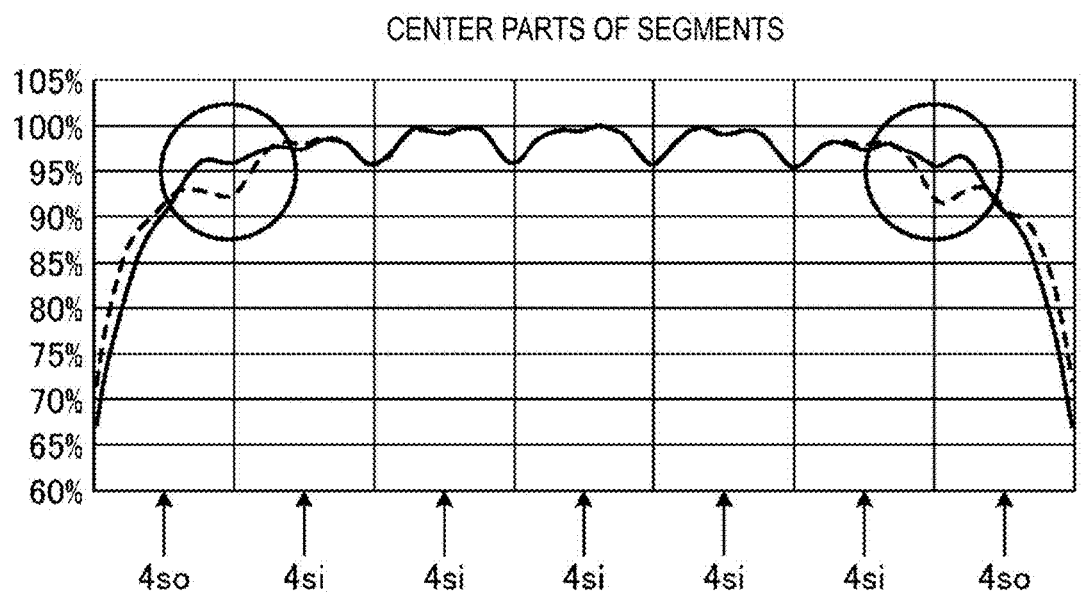
FIG. 10 is a graph comparing the uniformity of luminance in the planar illumination device of the first embodiment and the uniformity of luminance in the planar illumination device of the second embodiment in a cross section including a longitudinal direction and passing through optical axes of light sources.
Figure 11:
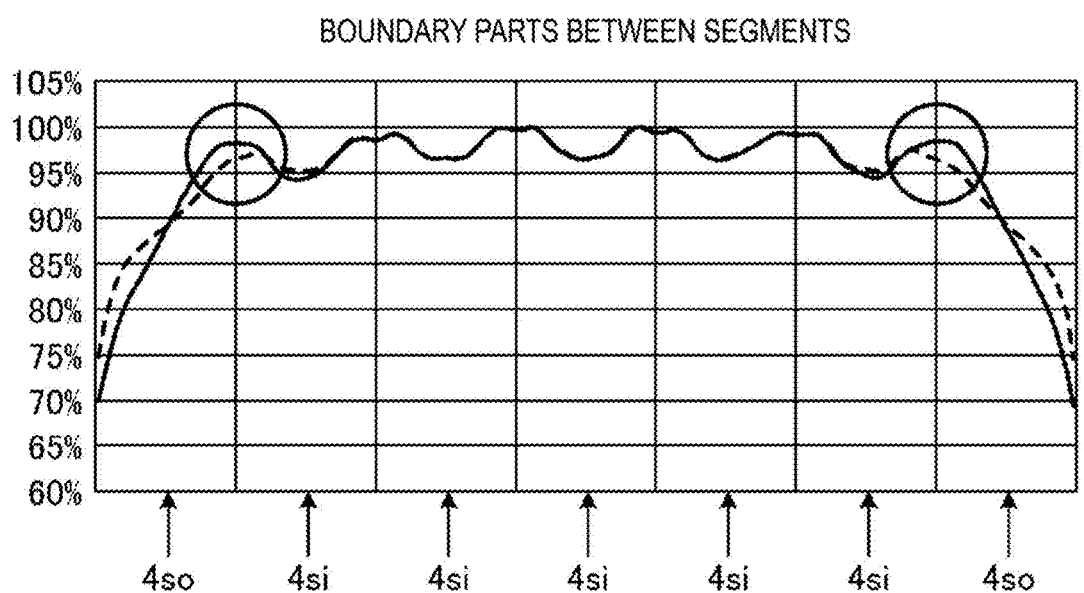
FIG. 11 is a graph comparing the uniformity of luminance in the planar illumination device of the first embodiment and the uniformity of luminance in the planar illumination device of the second embodiment in a cross section including a longitudinal direction and along ridge lines of wall portions.

A test apparatus having the same configuration as the planar illumination device 1A having the above-described configuration was made, and the uniformity of luminance at the emission surface R was evaluated as follows. More specifically, FIGS. 10 and 11 show graphs comparing the uniformity of luminance between the planar illumination device 1A having the above-described configuration including seven segments 4*s* in each of the longitudinal direction and the lateral direction and the planar illumination device 1 having the configuration of the first embodiment including seven segments 4*s* in each of the longitudinal direction and the lateral direction. FIG. 10 is a graph comparing the uniformity of luminance in the planar illumination device 1 of the first embodiment and the uniformity of luminance in the planar illumination device 1A of the second embodiment in a cross section including the longitudinal direction and passing through the optical axes 30*j* of the light sources 30 (that is, a cross section passing through the center parts of the segments). FIG. 11 is a graph comparing the uniformity of luminance in the planar illumination device 1 of the first embodiment and the uniformity of luminance in the planar illumination device 1A of the second embodiment in a cross section including the longitudinal direction and along a ridge line 40*kr* of a wall portion 40*k* (that is, a cross section passing through the ridge lines kr (in other words, a cross section passing through boundary parts between the segments)). In FIGS. 10 and 11, while the solid line indicates the luminance of the planar illumination device 1A according to the present embodiment, the broken line indicates the luminance of the planar illumination device 1 according to the first embodiment.

As illustrated in FIG. 9, in the planar illumination device 1A according to the present embodiment, the reflection surfaces 4*fxi* and 4*fyi* located at the inner side and the reflection surfaces 4*fxo* and 4*fyo* located at the outer side in the longitudinal direction and the lateral direction are asymmetric at the outer peripheral part segments 4*so* disposed at the outer peripheral part of the reflector 4A out of the plurality of segments 4s. In addition, at the outer peripheral part segments 4so, the intersection angles of the substrate 3 with respect to the reflection surfaces 4fxi and 4fyi located at the inner side in the longitudinal direction and the lateral direction is larger than the intersection angles of the substrate 3 with respect to the substrate side reflection surfaces 4fxod and 4fyod located at the outer side in the longitudinal direction and the lateral direction. Thus, at the outer peripheral part segments 4so of the planar illumination device 1A according to the present embodiment, light emitted from the light source 30 is reflected by the reflection surfaces 4fxi and 4fyi located at the inner side, and the light is emitted to the emission surface R between the light source 30 and a partition wall 4koi at the inner side in the outer peripheral part segment 4so. Accordingly, the planar illumination device 1A according to the present embodiment can increase the luminance at portions immediately above the partition walls 4koi at the inner side in the outer peripheral part segments 4so (portions encircled in FIGS. 10 and 11) as compared to the planar illumination device 1 according to the first embodiment. As a result, the planar illumination device 1A according to the present embodiment can further uniformize the luminance at the emission surface R.

In the embodiment described above, a description has been made to the effect that, in the longitudinal direction of the planar illumination device 1A, the length 30X1 between the light source 30 and the inner edge of the reflection surface 4fxi forming the first opening 401 is substantially equal to or slightly different from the length 30X2 between the light source 30 and the inner edge of the reflection surface 4fxo forming the first opening 401. However, the planar illumination device 1A according to the present embodiment is not limited to this, and the length 30X1 and the length 30X2 may be the same or may be different as will be described below. The same applies to the lateral direction.

First Modification Example of Second Embodiment

Figure 12:
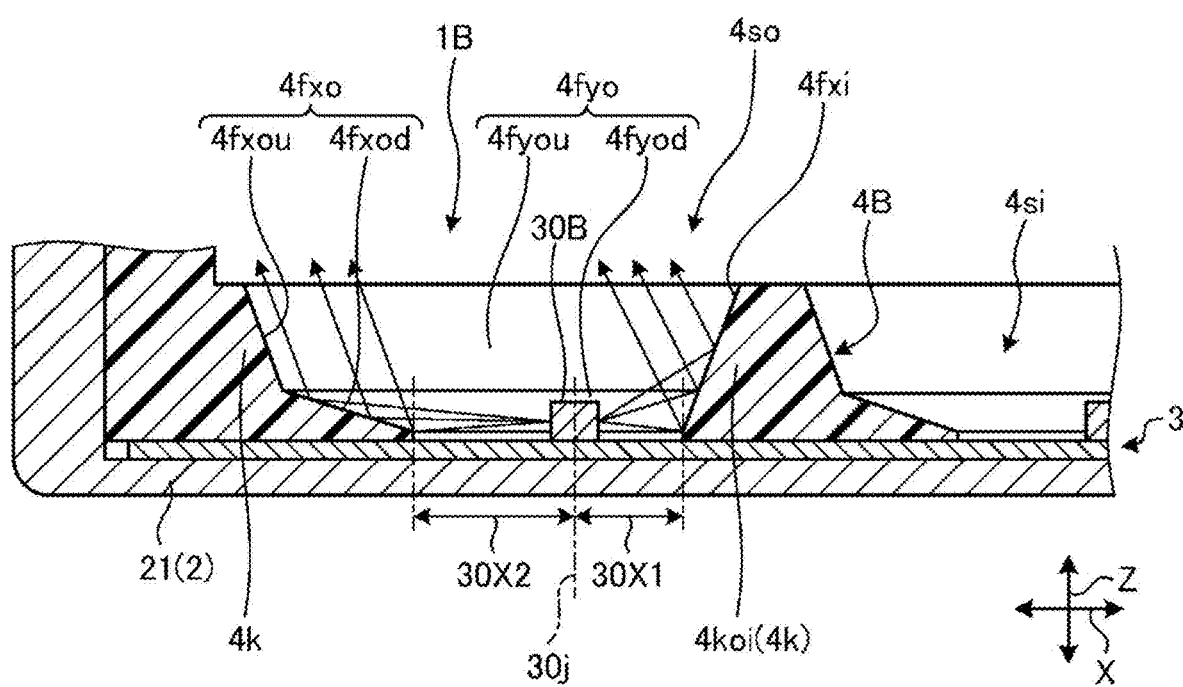
FIG. 12 is a cross-sectional view, similar to FIG. 9, of a substrate and a reflector of a planar illumination device of a first modification example according to the second embodiment.

FIG. 12 is a cross-sectional view, similar to FIG. 9, of the substrate 3 and a reflector 4B of a planar illumination device 1B of a first modification example according to the second embodiment. The planar illumination device 1B according to the first modification example described below includes a light source 30B different from the light source 30 of the planar illumination device 1A according to the second embodiment in terms of the following aspect. Hereinafter, the light source 30B of the planar illumination device 1B according to the first modification example of the second embodiment will be described in detail, the light source 30B being different in configuration from the planar illumination device 1A according to the second embodiment.

In the longitudinal direction (first direction) of the planar illumination device 1B according to the present modification example, the length 30X1 between the optical axis 30j of the light source 30B and an inner edge of the reflection surface 4fxi forming the first opening 401 is shorter than the length 30X2 between the optical axis 30j of the light source 30B and an inner edge of the reflection surface 4fxo forming the first opening 401. That is, the light source 30B disposed at the outer peripheral part segment 4so is closer to the reflection surface 4fxi at an inner side than to the reflection surface 4fxo at an outer side in the longitudinal direction (first direction). In other words, the light source 30B disposed at the outer peripheral part segment 4so is closer to one reflection surface 4fxi than the other reflection surface 4fxo.

Although not illustrated, in the lateral direction (second direction) of the planar illumination device 1B according to the present modification example, the length 30Y1 between the optical axis 30j of the light source 30B and an inner edge of the reflection surface 4fyi forming the first opening 401 is shorter than the length 30Y2 between the optical axis 30j of the light source 30 and an inner edge of the reflection surface 4fyo forming the first opening 401. That is, the light source 30 disposed at the outer peripheral part segment 4so is closer to the reflection surface 4fyi at an inner side than to the reflection surface 4fyo at an outer side with respect to the light source 30 in the lateral direction (second direction). In other words, the light source 30B disposed at the outer peripheral part segment 4so is closer to one reflection surface 4fyi than the other reflection surface 4fyo.

Since the light sources 30B at the outer peripheral part segments 4so are located closer to the reflection surfaces 4fxi and 4fyi at the inner side than to the reflection surfaces 4fxo and 4fyo at the outer side, the planar illumination device 1B according to the present modification example can increase the luminance at portions immediately above the wall portions 4koi at the inner side of the outer peripheral part segments 4so. Accordingly, the planar illumination device 1B according to the present modification example can further uniformize the luminance at the emission surface R.

Second Modification Example of Second Embodiment

Figure 13:
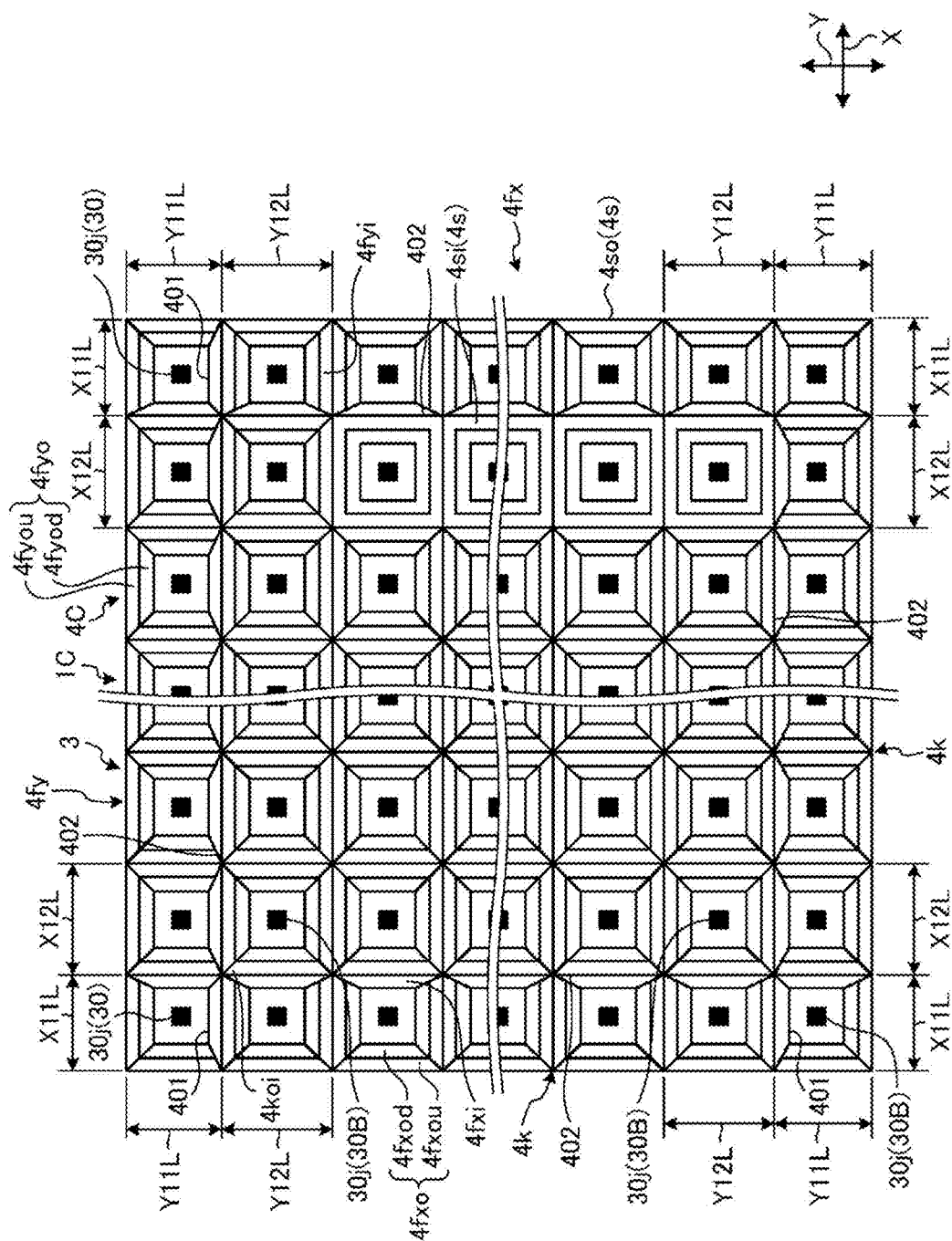
FIG. 13 is a plan view, similar to FIG. 8, of a substrate and a reflector of a planar illumination device of a second modification example according to the second embodiment.

FIG. 13 is a plan view, similar to FIG. 8, of the substrate 3 and a reflector 4C of a planar illumination device 1C of a second modification example according to the second embodiment. The planar illumination device 1C according to the second modification example described below exemplifies the segment 4s different from the segment 4s of the planar illumination device 1B according to the first modification example in terms of the following aspect. The segment 4s of the planar illumination device 1C according to the second modification example will be described below.

In the planar illumination device 1C according to the present modification example, a length X11L of the outer peripheral part segment 4so is shorter than a length X12L of the inner side segment 4si in the longitudinal direction (first direction), and a length Y11L of the outer peripheral part segment 4so is shorter than a length Y12L of the inner side segment 4si in the lateral direction (second direction). That is, the area of the second opening (emission surface side opening) 402 of the outer peripheral part segment 4so is smaller than the area of the second opening (emission surface side opening) 402 of the inner side segment 4si.

In the outer peripheral part segments 4so at four corners of the planar illumination device 1C according to the present modification example, the length X11L in the longitudinal direction (first direction) is equal to the length Y11L in the lateral direction (second direction). That is, the outer peripheral part segments 4so at the four corners of the planar illumination device 1C according to the present modification example are formed in a square shape.

The planar illumination device 1C according to the present modification example can increase the amount of light per unit area from the light source 30 at the outer peripheral part segment 4so more than the amount of light per unit area from the light source 30 at the inner side segment 4si, and thus can increase the luminance at the outer peripheral part segment 4so. Accordingly, the planar illumination device 1C according to the present modification example can improve the uniformity of luminance at the emission surface R.

Figure 14:
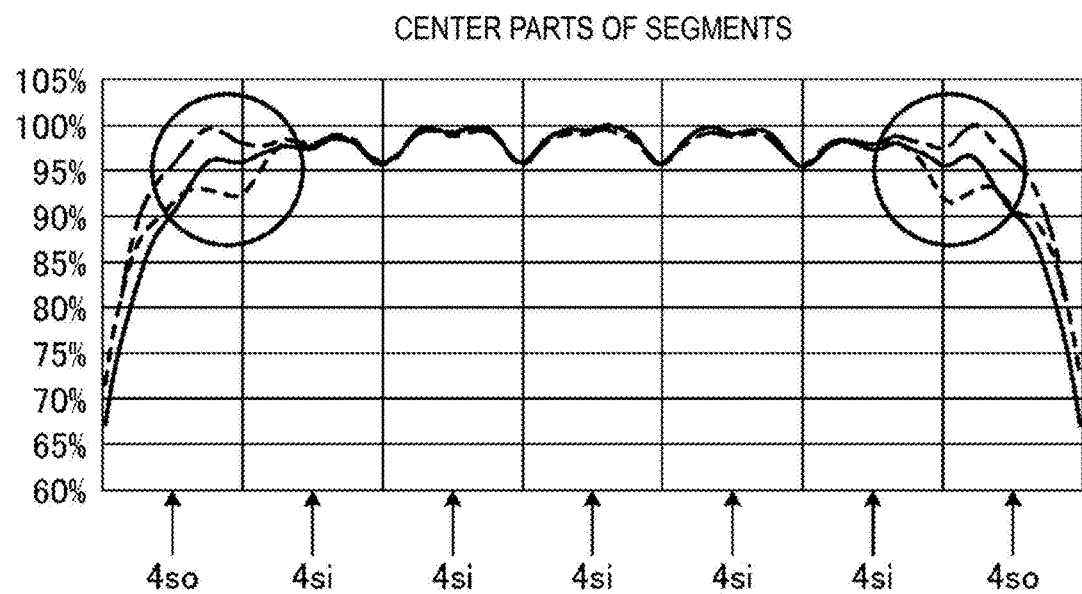
FIG. 14 is a graph comparing the uniformity of luminance in the planar illumination device of the first embodiment and the uniformity of luminance in the planar illumination device of the second modification example of the second embodiment in a cross section including a longitudinal direction and passing through optical axes of light sources.
Figure 15:
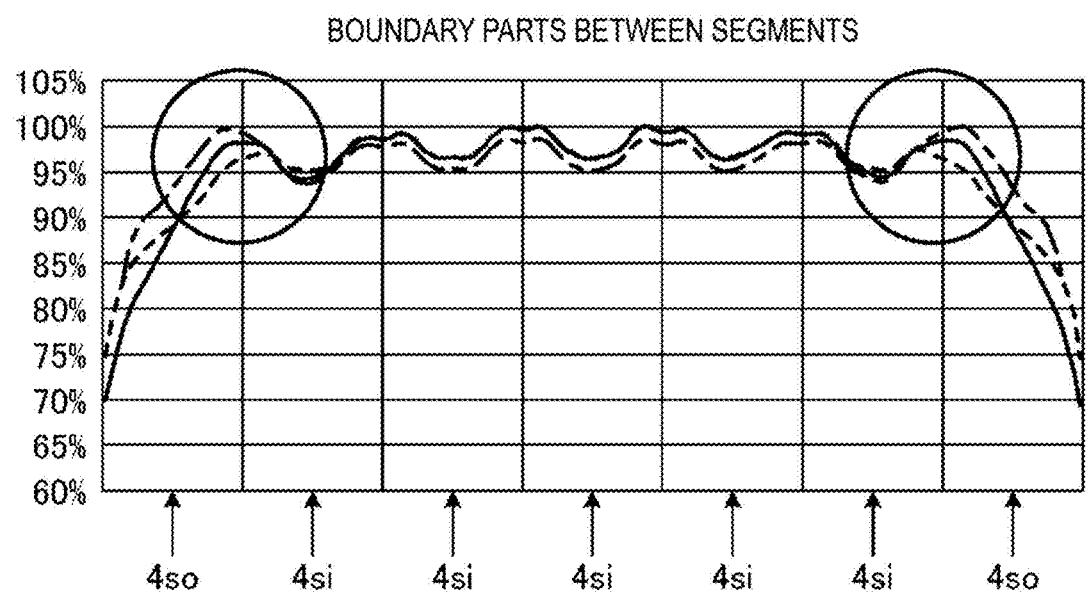
FIG. 15 is a graph comparing the uniformity of luminance in the planar illumination device of the first embodiment and the uniformity of luminance in the planar illumination device of the second modification example of the second embodiment in a cross section including a longitudinal direction and along ridge lines of wall portions.

A test apparatus having the same configuration as the planar illumination device 1C having the above-described configuration was made, and the uniformity of luminance at the emission surface R was evaluated as follows. More specifically, FIGS. 14 and 15 show graphs comparing the uniformity of luminance between the planar illumination device 1C having the above-described configuration including seven segments 4s in each of the longitudinal direction and the lateral direction, the planar illumination device 1A having the configuration of the second embodiment including seven segments 4s in each of the longitudinal direction and the lateral direction, and the planar illumination device 1 having the configuration of the first embodiment including seven segments 4s in each of the longitudinal direction and the lateral direction. FIG. 14 is a graph comparing the uniformity of luminance in the planar illumination device 1 of the first embodiment and the uniformity of luminance in the planar illumination device 1C of the second modification example of the second embodiment in a cross section including the longitudinal direction and passing through the optical axes 30j of the light sources 30 (that is, a cross section passing through the center parts of the segments). FIG. 15 is a graph comparing the uniformity of luminance in the planar illumination device 1 of the first embodiment and the uniformity of luminance in the planar illumination device 1C of the second modification example of the second embodiment in a cross section including the longitudinal direction and along the ridge line 40kr of the wall portion 40k (that is, a cross section passing through the ridge lines kr (in other words, a cross section passing through boundary parts between the segments)). In FIGS. 14 and 15, the dash-dotted line indicates the luminance of the planar illumination device 1C according to the present modification example, the solid line indicates the luminance of the planar illumination device 1A according to the second embodiment, and the broken line indicates the luminance of the planar illumination device 1 according to the first embodiment.

The planar illumination device 1C according to the present modification example can increase the luminance at portions immediately above the partition walls 4koi located at the inner side of the outer peripheral part segments 4so (portions encircled in FIGS. 14 and 15) as compared to the planar illumination device 1 according to the first embodiment and the planar illumination device 1A according to the second embodiment. Accordingly, the planar illumination device 1C according to the present modification example can further uniformize the luminance at the emission surface R.

For the outer peripheral part segments 4so at four corners of the planar illumination device 1C according to the above-described second modification example, a description has been made to the effect that the length X11L in the longitudinal direction (first direction) is equal to the length Y11L in the lateral direction (second direction). However, the planar illumination device 1C according to the present modification example is not limited to this. For example, in the outer peripheral part segment 4so, the length in one of the longitudinal direction and the lateral direction may be longer than the length in the other.

Third Embodiment

Figure 16:
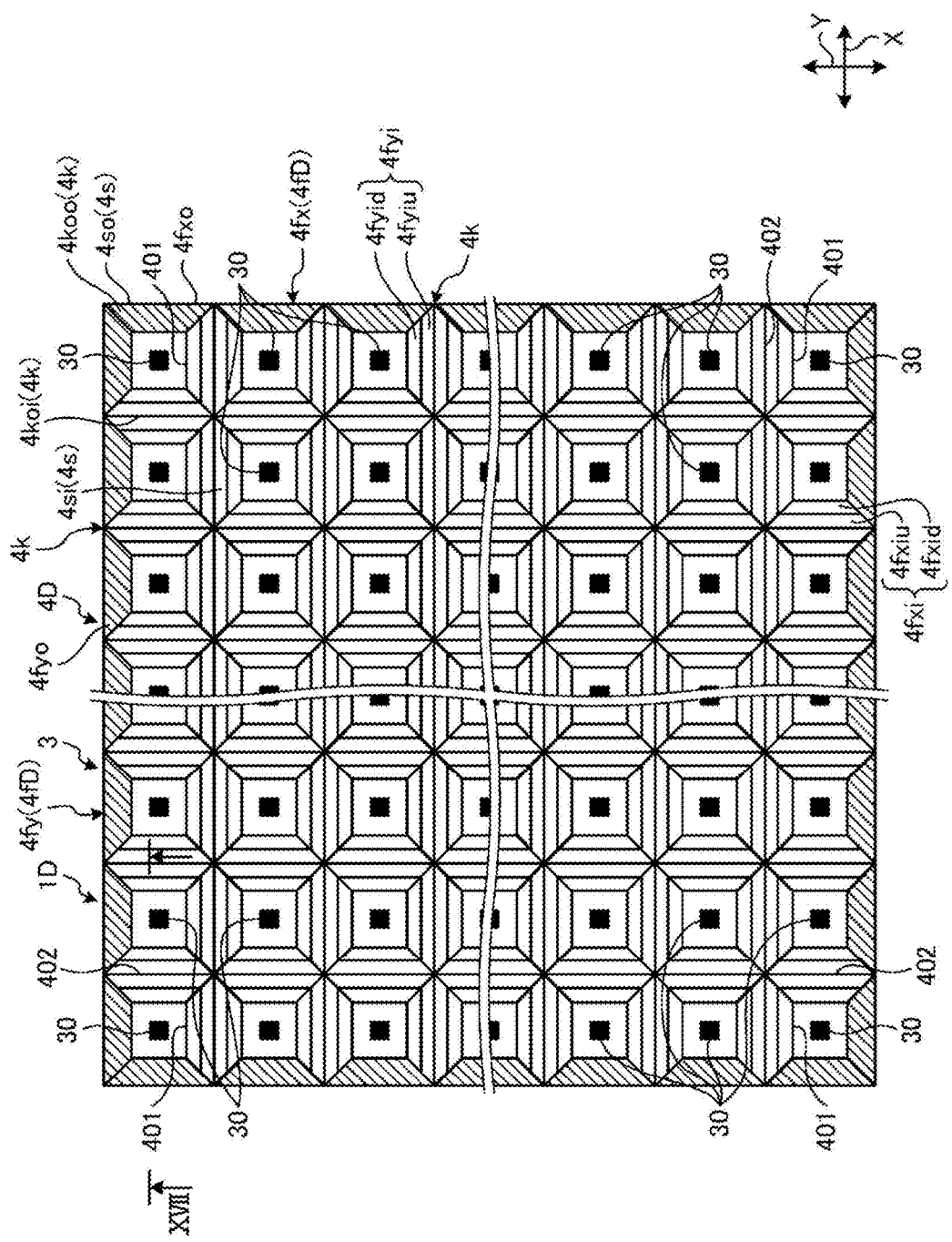
FIG. 16 is a plan view of a substrate and a reflector of a planar illumination device according to a third embodiment.
Figure 17:
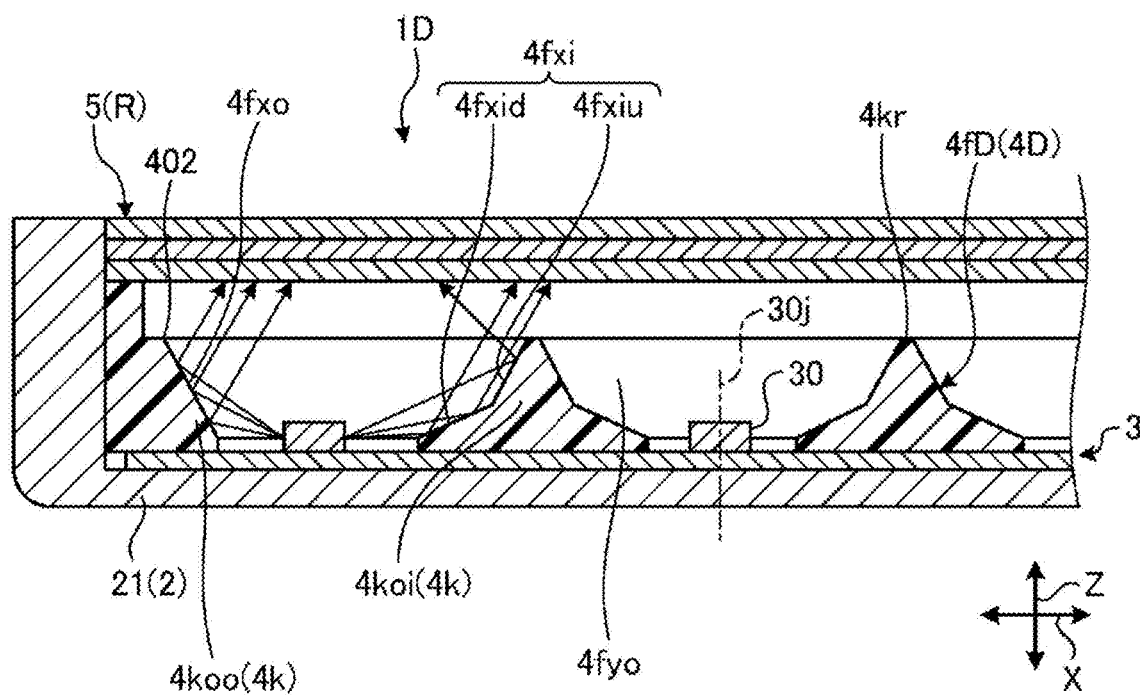
FIG. 17 is a cross-sectional view, similar to FIG. 9, of the substrate and the reflector of the planar illumination device according to the third embodiment.

FIG. 16 is a plan view of the substrate 3 and a reflector 4D of a planar illumination device 1D according to a third embodiment. FIG. 17 is a cross-sectional view, similar to FIG. 9, of the substrate 3 and the reflector 4D of the planar illumination device 1D according to the third embodiment. For the outer peripheral part segments 4so illustrated in FIG. 16, as will be described below, reflection surfaces 4fxo and 4fyo at an outer side composed of a single-step reflection surface are hatched so as to clearly indicate the reflection surfaces 4fxo and 4fyo. The reflector 4D of the planar illumination device 1D according to the third embodiment illustrated in FIGS. 16 and 17 and described below includes a reflection surface 4fD different from the reflection surface 4f of the reflector 4 of the planar illumination device 1 according to the first embodiment. More specifically, the reflection surface 4fD at the outer peripheral part segment 4so according to the present embodiment is different from the reflection surface 4f at the outer peripheral part segment 4so according to the first embodiment. On the other hand, the reflection surface 4fD at the inner side segment 4si according to the present embodiment is the same as the reflection surface 4f at the inner side segment 4si according to the first embodiment. Hereinafter, the reflection surfaces 4fD at the outer peripheral part segments 4so of the planar illumination device 1D according to the third embodiment will be described in detail.

Similar to the reflection surface 4f according to the planar illumination device 1 of the first embodiment, each of the reflection surfaces 4fD includes a pair of first reflection surfaces 4fx and a pair of second reflection surfaces 4fy. Of the pair of first reflection surfaces 4fx of the outer peripheral part segment 4so according to the present embodiment, the reflection surface at an outer side is referred to as a first reflection surface 4fxo, and the reflection surface at an inner side is referred to as a first reflection surface 4fxi. Then, an emission surface side reflection surface 4fxu of the first reflection surface 4fxi at the inner side is referred to as an emission surface side reflection surface 4fxiu, and a substrate side reflection surface 4fxd of the first reflection surface 4fxi is referred to as a substrate side reflection surface 4fxid. An intersection angle of the substrate 3 with respect to the emission surface side reflection surface 4fxiu is larger than an intersection angle of the substrate 3 with respect to the substrate side reflection surface 4fxid. On the other hand, the reflection surface 4fxo at an outer side is formed to have a constant intersection angle with respect to the substrate 3. Then, an intersection angle of the substrate 3 with respect to the reflection surface 4fxo at the outer side is larger than an intersection angle of the substrate 3 with respect to the substrate side reflection surface 4fxid at the inner side.

Of the pair of second reflection surfaces 4fy of the outer peripheral part segment 4so according to the present embodiment, the reflection surface at an outer side is referred to as a second reflection surface 4fyo, and the reflection surface at an inner side is referred to as a second reflection surface 4fyi. Then, an emission surface side reflection surface 4fyu of the second reflection surface 4fyi at the inner side is referred to as an emission surface side reflection surface 4fyiu, and a substrate side reflection surface 4fyd of the second reflection surface 4fyi is referred to as a substrate side reflection surface 4fyid. An intersection angle of the substrate 3 with respect to the emission surface side reflection surface 4fyiu is larger than an intersection angle of the substrate 3 with respect to the substrate side reflection surface 4fyid. On the other hand, the reflection surface 4fyo at an outer side is formed to have a constant intersection angle with respect to the substrate 3. Then, an intersection angle of the substrate 3 with respect to the reflection surface 4fyo at the outer side is larger than an intersection angle of the substrate 3 with respect to the substrate side reflection surface 4fyid at the inner side.

In addition, at the outer peripheral part segments 4so located between the outer peripheral part segments 4so at the four corners in the lateral direction and located at both ends in the longitudinal direction, the intersection angle of the substrate 3 with respect to the reflection surface 4fxo at the outer side is larger than the intersection angle of the substrate 3 with respect to the substrate side reflection surface 4fxid at the inner side. Further, at the above-described outer peripheral part segments 4so, the pair of second reflection surfaces 4fy opposing each other in the lateral direction can be appropriately changed as necessary.

Similarly, at the outer peripheral part segments 4so located between the outer peripheral part segments 4so at the four corners in the longitudinal direction and located at both ends in the lateral direction, the intersection angle of the substrate 3 with respect to the reflection surface 4fyo at the outer side is larger than the intersection angle of the substrate 3 with respect to the substrate side reflection surface 4fyid at the inner side. Further, at the above-described outer peripheral part segments 4so, the pair of first reflection surfaces 4fx opposing each other in the longitudinal direction can be appropriately changed as necessary.

The reflection surfaces 4fD of the outer peripheral part segments 4so according to the present embodiment are formed line-symmetrically with respect to a center line of the reflector 4D in the longitudinal direction and is formed line-symmetrically with respect to a center line of the reflector 4D in the lateral direction.

In the longitudinal direction (first direction) of the planar illumination device 1D according to the present embodiment, the length 30X1 between the optical axis 30j of the light source 30 and an inner edge of the reflection surface 4fxi forming the first opening 401 is substantially equal to or slightly different from the length 30X2 between the optical axis 30j of the light source 30 and an inner edge of the reflection surface 4fxo forming the first opening 401, but these lengths may be equal to each other, or may be different from each other as described in the first embodiment.

Further, in the lateral direction (second direction) of the planar illumination device 1D according to the present embodiment, the length 30Y1 between the optical axis 30j of the light source 30 and an inner edge of the reflection surface 4fyi forming the first opening 401 is substantially equal to or slightly different from the length 30Y2 between the optical axis 30j of the light source 30 and an inner edge of the reflection surface 4fyo forming the first opening 401, but these lengths may be equal to each other, or may be different from each other as described in the first embodiment.

Figure 18:
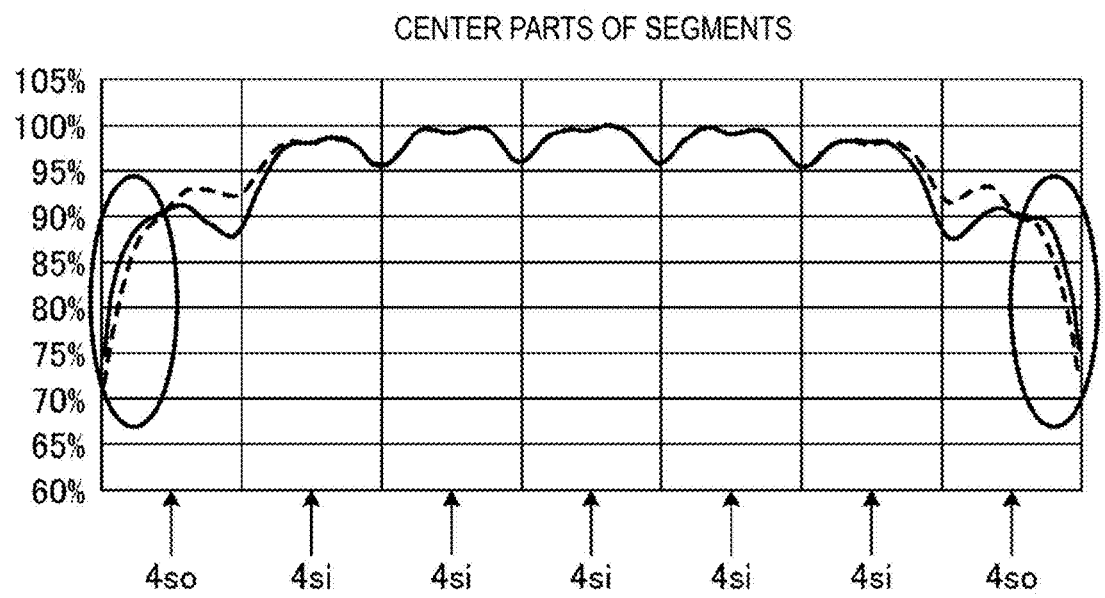
FIG. 18 is a graph comparing the uniformity of luminance in the planar illumination device of the first embodiment and the uniformity of luminance in the planar illumination device of the third embodiment in a cross section including a longitudinal direction and passing through optical axes of light sources.
Figure 19:
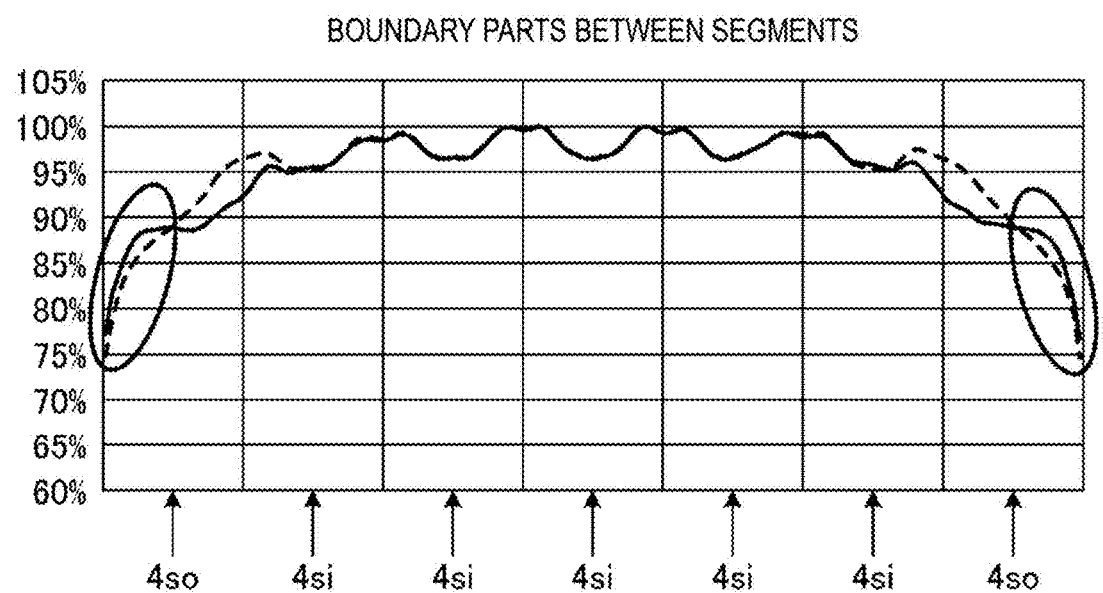
FIG. 19 is a graph comparing the uniformity of luminance in the planar illumination device of the first embodiment and the uniformity of luminance in the planar illumination device of the third embodiment in a cross section including a longitudinal direction and along ridge lines of wall portions.

A test apparatus having the same configuration as the planar illumination device 1D having the above-described configuration was made, and the uniformity of luminance at the emission surface R was evaluated as follows. More specifically, FIGS. 18 and 19 show graphs comparing the uniformity of luminance between the planar illumination device 1D having the above-described configuration including seven segments 4s in each of the longitudinal direction and the lateral direction and the planar illumination device 1 having the configuration of the first embodiment including seven segments 4s in each of the longitudinal direction and the lateral direction. FIG. 18 is a graph comparing the uniformity of luminance in the planar illumination device 1 of the first embodiment and the uniformity of luminance in the planar illumination device 1D of the third embodiment in a cross section including the longitudinal direction and passing through the optical axes 30j of the light sources 30 (that is, a cross section passing through the center parts of the segments). FIG. 19 is a graph comparing the uniformity of luminance in the planar illumination device 1 of the first embodiment and the uniformity of luminance in the planar illumination device 1D of the third embodiment in a cross section including the longitudinal direction and along the ridge line 40kr of the wall portion 40k (that is, a cross section passing through the ridge lines kr (in other words, a cross section passing through boundary parts between the segments)). In FIGS. 18 and 19, while the solid line indicates the luminance of the planar illumination device 1D according to the present embodiment, the broken line indicates the luminance of the planar illumination device 1 according to the first embodiment.

As illustrated in FIG. 17, in the planar illumination device 1D according to the present embodiment, the intersection angles of the substrate 3 with respect to the reflection surfaces 4fxo and 4fyo located at the outer side in the longitudinal direction and the lateral direction are larger than the intersection angles of the substrate 3 with respect to the substrate side reflection surfaces 4fxid and 4fyid located at the inner side in the longitudinal direction and the lateral direction. Thus, at the outer peripheral part segments 4so of the planar illumination device 1D according to the present embodiment, light emitted from the light source 30 is reflected by the reflection surfaces 4fxo and 4fyo located at the outer side, and the light is emitted to the emission surface R between a partition wall 4koo at the outer side in the outer peripheral part segment 4so and the light source 30. Accordingly, the planar illumination device 1D according to the present embodiment can increase the luminance at portions immediately above the partition walls 4koo at the outer side in the outer peripheral part segments 4so (portions encircled in FIGS. 18 and 19) as compared to the planar illumination device 1 according to the first embodiment. As a result, the planar illumination device 1D according to the present embodiment can further uniformize the luminance at the emission surface R.

First Modification Example of Third Embodiment

Figure 20:
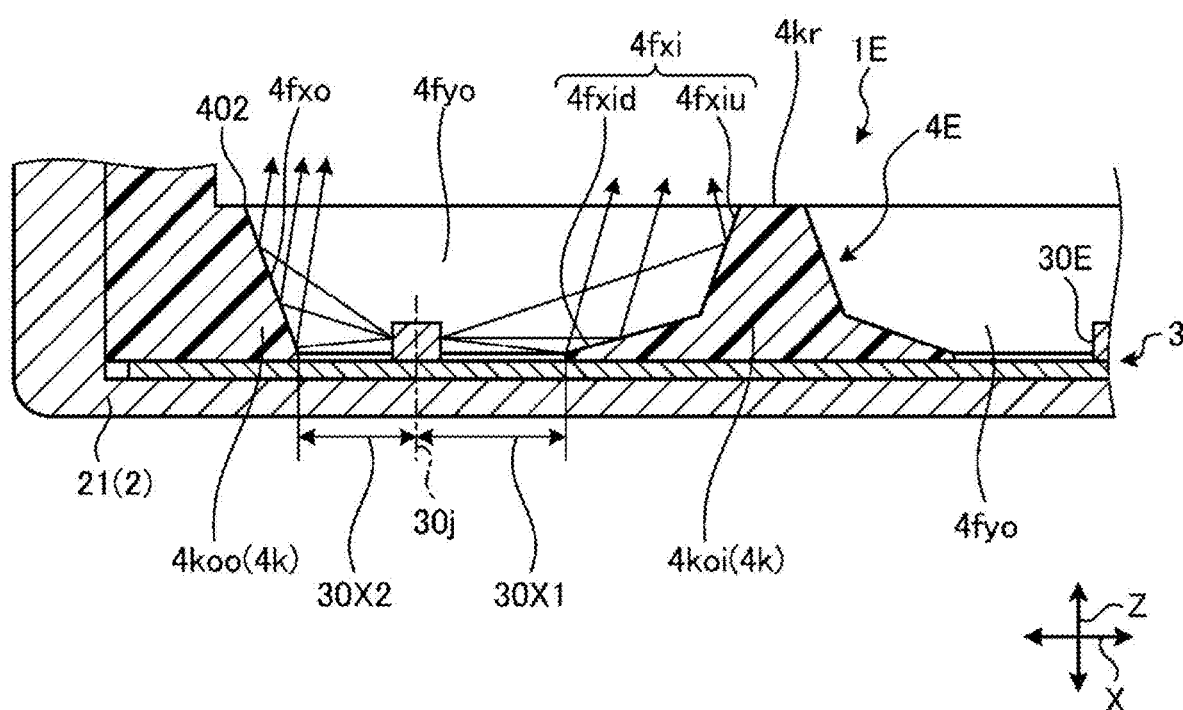
FIG. 20 is a cross-sectional view, similar to FIG. 9, of a substrate and a reflector of a planar illumination device according to a first modification example of the third embodiment.

FIG. 20 is a cross-sectional view, similar to FIG. 9, of the substrate 3 and a reflector 4E of a planar illumination device 1E according to a first modification example of the third embodiment. The planar illumination device 1E according to the first modification example described below exemplifies a light source 30E different from the light source 30 of the planar illumination device 1 according to the first embodiment in terms of the following aspect. Hereinafter, the light source 30E of the planar illumination device 1E according to the first modification example of the third embodiment will be described in detail, the light source 30E being different in configuration from the planar illumination device 1 according to the first embodiment.

In the longitudinal direction (first direction) of the outer peripheral part segment 4so of the planar illumination device 1E according to the present modification example, the length 30X2 between the optical axis 30j of the light source 30E and an inner edge of the reflection surface 4fxo forming the first opening 401 is shorter than the length 30X1 between the optical axis 30j of the light source 30E and an inner edge of the reflection surface 4fxi forming the first opening 401. That is, the light source 30E disposed at the outer peripheral part segment 4so is closer to the reflection surface 4fxo (the other reflection surface) at an outer side than to the reflection surface 4fxi (one reflection surface) at an inner side in the longitudinal direction (first direction). In other words, the light source 30E disposed at the outer peripheral part segment 4*so* is closer to the other reflection surface 4*fxo* than to the one reflection surface 4*fxi*.

Although not illustrated, in the lateral direction (second direction) of the planar illumination device 1E according to the present modification example, the length between the optical axis 30*j* of the light source 30 and an inner edge of the reflection surface 4*fyo* forming the first opening 401 is shorter than the length between the optical axis 30*j* of the light source 30 and an inner edge of the reflection surface 4*fyi* forming the first opening 401. That is, the light source 30E disposed at the outer peripheral part segment 4*so* is closer to the reflection surface 4*fyo* (the other reflection surface) at an outer side than to the reflection surface 4*fyi* (one reflection surface) at an inner side in the lateral direction (second direction). In other words, the light source 30E disposed at the outer peripheral part segment 4*so* is closer to the other reflection surface 4*fyo* than to the one reflection surface 4*fyi*.

Since the light sources 30E at the outer peripheral part segments 4*so* are located closer to the reflection surfaces 4*fxo* and 4*fyo* at the outer side than to the reflection surfaces 4*fxi* and 4*fyi* at the inner side, the planar illumination device 1E according to the present modification example can increase the luminance at portions immediately above the wall portions 4*koo* at the outer side in the outer peripheral part segments 4*so*. Accordingly, the planar illumination device 1E according to the present modification example can further uniformize the luminance at the emission surface R.

Second Modification Example of Third Embodiment

Note that, in the planar illumination devices 1D and 1E according to the third embodiment described above, the areas of the plurality of segments 4*s* are the same and the areas of the second openings 402 of the plurality of segments 4*s* are the same. However, the planar illumination devices 1D and 1E according to the present embodiment are not limited to this. For example, as in the planar illumination device 1C according to the second modification example of the second embodiment, in the second modification example of the planar illumination devices 1D and 1E according to the third embodiment, the area of the second opening 402 of the outer peripheral part segment 4*so* may be smaller than the area of the second opening 402 of the inner side segment 4*si*.

Figure 21:
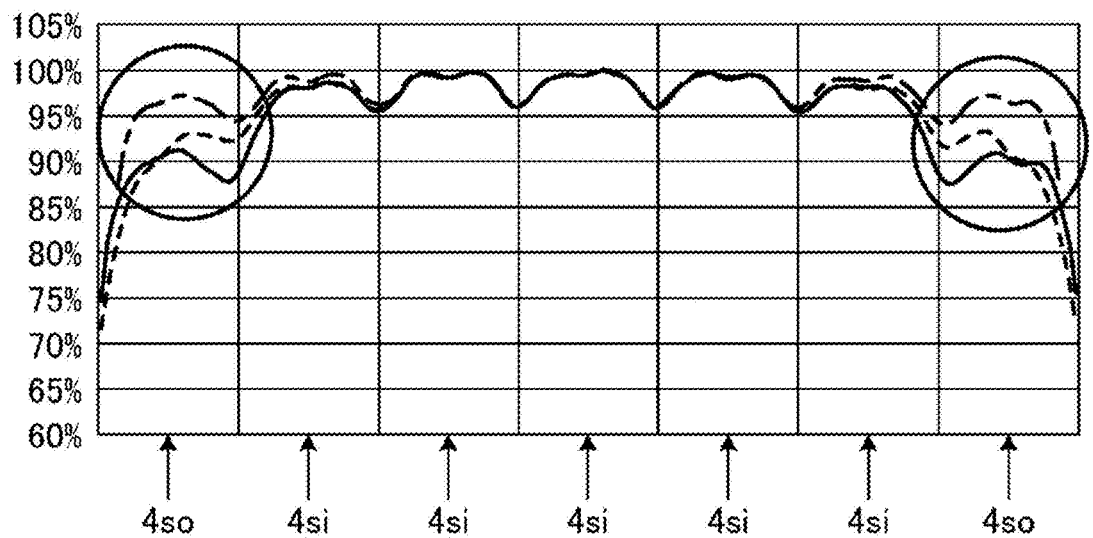
FIG. 21 is a graph comparing the uniformity of luminance in the planar illumination device of the first embodiment and the uniformity of luminance in a planar illumination device of a second modification example of the third embodiment in a cross section including a longitudinal direction and passing through optical axes of light sources.
Figure 22:
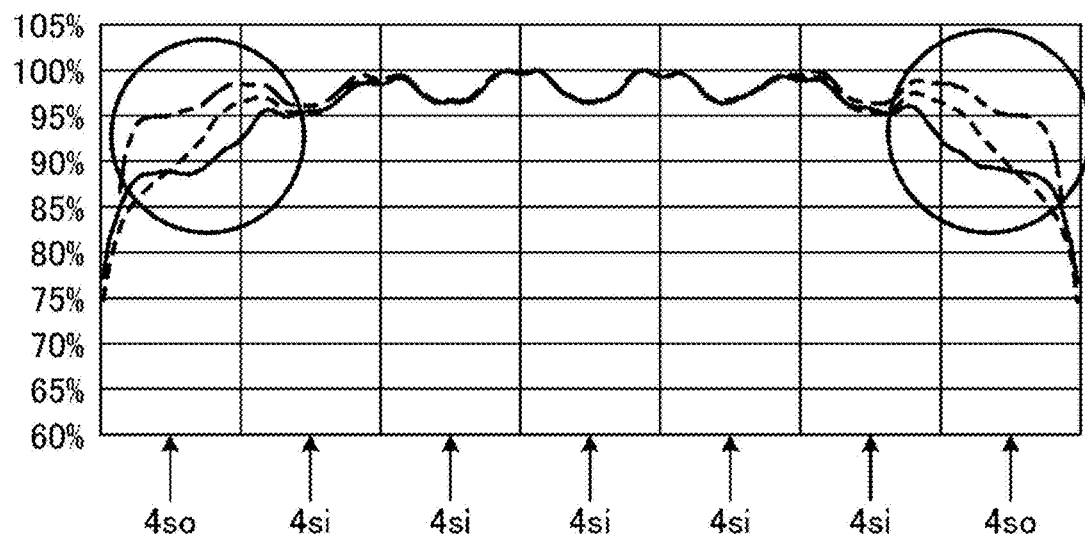
FIG. 22 is a graph comparing the uniformity of luminance in the planar illumination device of the first embodiment and the uniformity of luminance in the planar illumination device of the second modification example of the third embodiment in a cross section including a longitudinal direction and along ridge lines of wall portions.

A test apparatus having the same configuration as the planar illumination device according to the above-described second modification example was made, and the uniformity of luminance at the emission surface R was evaluated as follows. More specifically, FIGS. 21 and 22 show graphs comparing the uniformity of luminance between the planar illumination device having the configuration of the above-described second modification example of the third embodiment including seven segments 4*s* in each of the longitudinal direction and the lateral direction, the planar illumination device 1E having the configuration of the first modification example of the third embodiment including seven segments 4*s* in each of the longitudinal direction and the lateral direction, and the planar illumination device 1 having the configuration of the first embodiment including seven segments 4*s* in each of the longitudinal direction and the lateral direction. FIG. 21 is a graph comparing the uniformity of luminance in the planar illumination device 1 of the first embodiment and the uniformity of luminance in the planar illumination device of the second modification example of the third embodiment in a cross section including the longitudinal direction and passing through the optical axes 30*j* of the light sources 30 (that is, a cross section passing through the center parts of the segments). FIG. 22 is a graph comparing the uniformity of luminance in the planar illumination device 1 of the first embodiment and the uniformity of luminance in the planar illumination device of the second modification example of the third embodiment in a cross section including the longitudinal direction and along the ridge line 40*kr* of the wall portion 40*k* (that is, a cross section passing through the ridge lines kr (in other words, a cross section passing through boundary parts between the segments)). In FIGS. 21 and 22, the dash-dotted line indicates the luminance of the planar illumination device according to the second modification example of the third embodiment, the solid line indicates the luminance of the planar illumination device 1E according to the first modification example of the third embodiment, and the broken line indicates the luminance of the planar illumination device 1 according to the first embodiment.

In the planar illumination device according to the second modification example of the third embodiment, the area of the second opening 402 of the outer peripheral part segment 4*so* is smaller and the amount of light per unit area can be increased, and thus the luminance at portions immediately above the partition walls 4*koo* located at the outer side in the outer peripheral part segments 4*so* (portions encircled in FIGS. 21 and 22) can be increased as compared to the planar illumination device 1 according to the first embodiment and the planar illumination device 1E according to the first modification example of the third embodiment. Accordingly, the planar illumination device according to the present modification example can further uniformize the luminance at the emission surface R.

Fourth Embodiment

Figure 23:
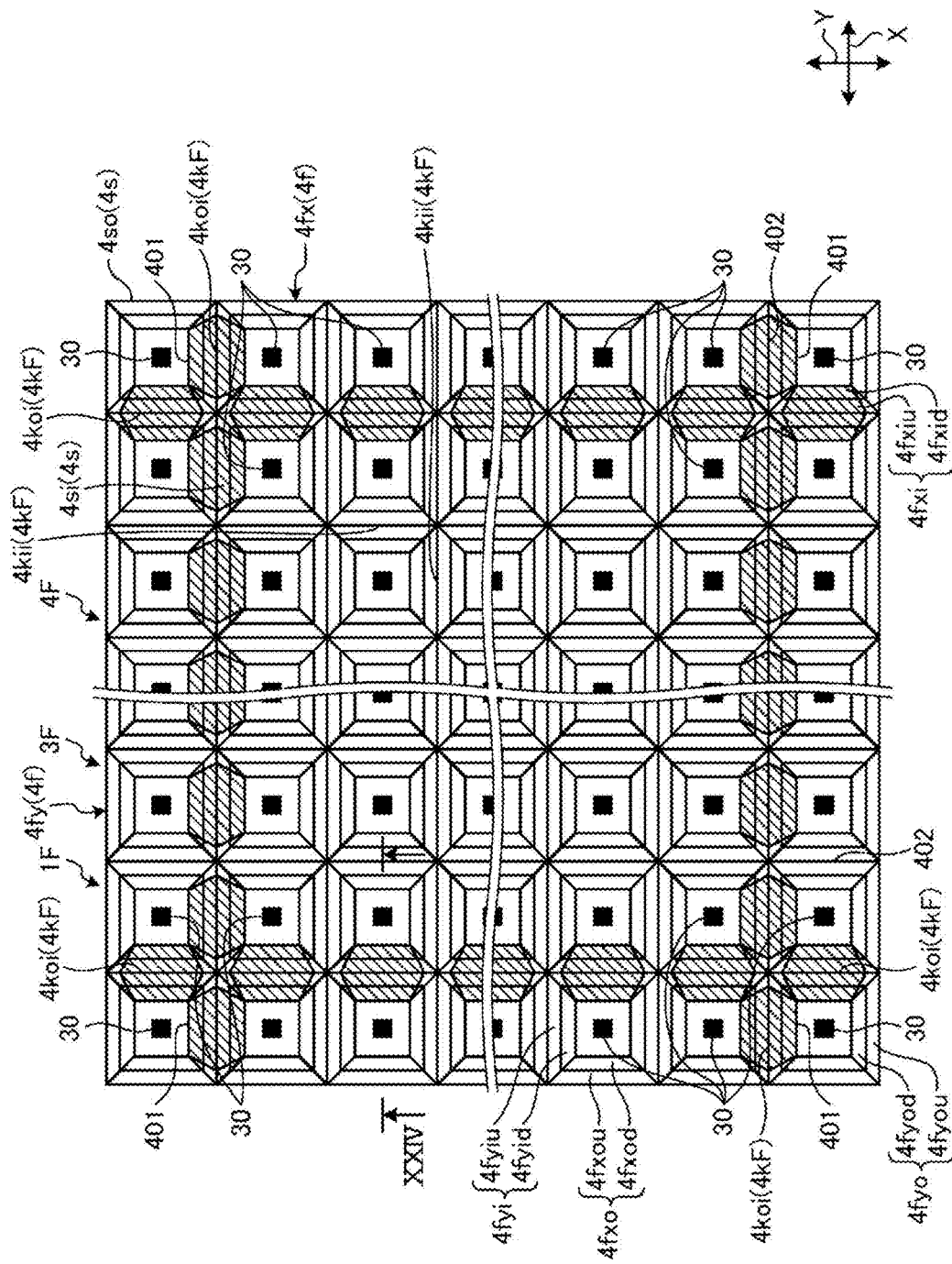
FIG. 23 is a plan view of a substrate and a reflector of a planar illumination device according to a fourth embodiment.
Figure 24:
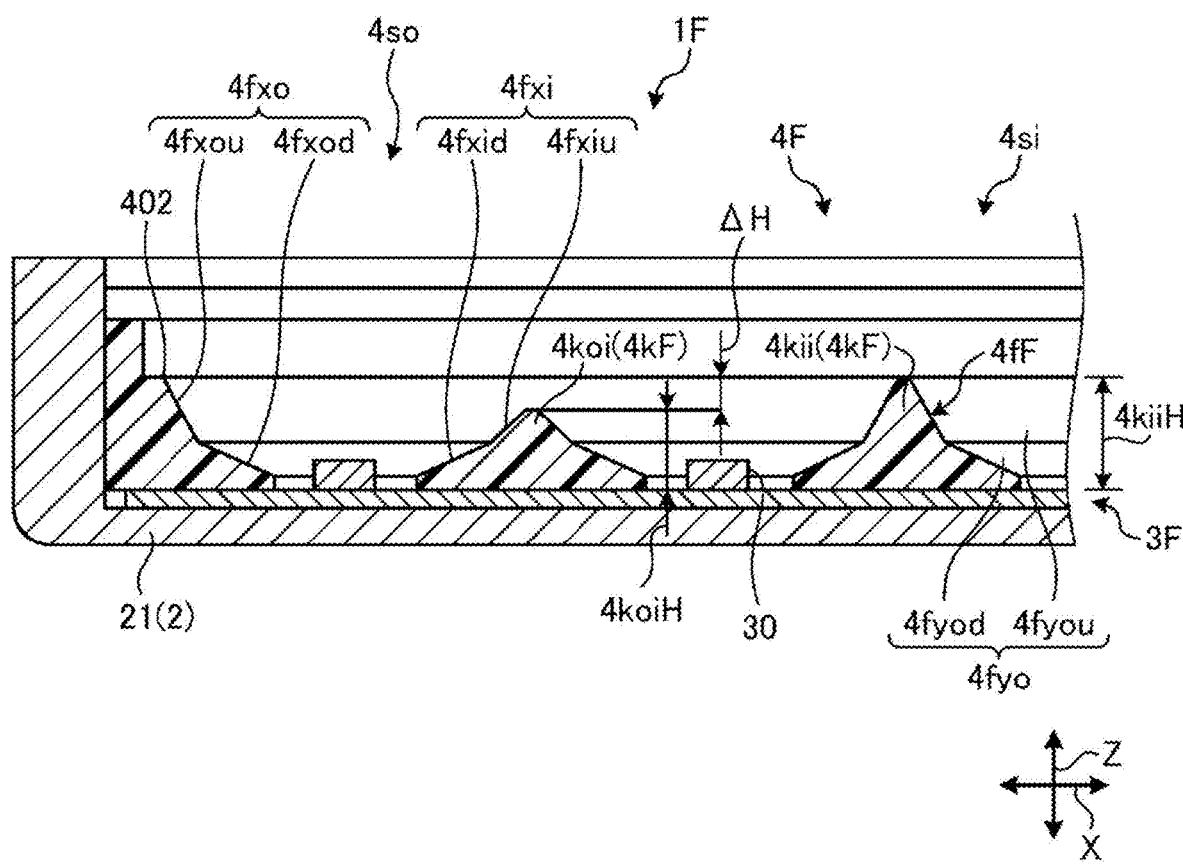
FIG. 24 is a cross-sectional view of the substrate and the reflector of the planar illumination device according to the fourth embodiment, taken along the arrow XXIV in FIG. 23.

FIG. 23 is a plan view of the substrate 3F and a reflector 4F of a planar illumination device 1F according to a fourth embodiment. FIG. 24 is a cross-sectional view of the substrate 3F and the reflector 4F of the planar illumination device 1F according to the fourth embodiment, and is a cross-sectional view of the substrate 3F and the reflector 4F taken along the arrow XXIV in FIG. 23. In FIG. 23, the partition walls 4*koi* described below forming the boundaries between the outer peripheral part segments 4*so* and the inner side segments 4*si* are hatched so as to clearly indicate the partition walls 4*koi*. The planar illumination device 1F according to the fourth embodiment illustrated in FIGS. 23 and 24 and described below includes a partition wall 4*kF* different from the partition wall 4*k* of the planar illumination device 1 according to the first embodiment. More specifically, the partition wall 4*koi* forming the boundary between the outer peripheral part segment 4*so* and the inner side segment 4*si* according to the present embodiment is different from the partition wall 4*k* forming the boundary between the outer peripheral part segment 4*so* and the inner side segment 4*si* according to the first embodiment. On the other hand, a partition wall 4*kii* forming the boundary between one inner side segment 4*si* and another inner side segment 4*si* adjacent to the one inner side segment 4*si* according to the present embodiment is the same as the partition wall 4*k* forming the boundary between one inner side segment 4*si* and another inner side segment 4*si* adjacent to the one inner side segment 4*si* according to the first embodiment. Hereinafter, the partition wall 4*koi* forming the boundary between the outer peripheral part segment 4*so* and the inner side segment 4*si* of the planar illumination device 1F according to the fourth embodiment will be described in detail.

The plurality of partition walls 4k of the planar illumination device 1 according to the first embodiment has been described as having the same height of protrusion from the surface of the substrate 3 at the emission surface side to one side in the thickness direction. On the other hand, for a plurality of partition walls 4kF of the planar illumination device 1F according to the fourth embodiment, the height of protrusion from the surface of the substrate 3F at the emission surface side to one side in the thickness direction is set as below.

For the partition wall 4koi forming the boundary between the outer peripheral part segment 4so and the inner side segment 4si in the longitudinal direction (first direction), the height of protrusion from the surface of the substrate 3F at the emission surface side to one side in the thickness direction is 4koiH.

For the partition wall 4kii forming the boundary between one inner side segment 4si and another inner side segment 4si adjacent to the one inner side segment 4si in the longitudinal direction (first direction), the height of protrusion from the surface of the substrate 3F at the emission surface side to one side in the thickness direction is 4kiiH. Then, the height 4koiH of the partition wall 4koi from the substrate 3F is lower than the height 4kiiH of the partition wall 4kii from the substrate 3F. In other words, the height 4koiH of the partition wall 4koi forming the boundary between the outer peripheral part segment 4so and the inner side segment 4si is lower than the height 4kiiH of other partition walls 4kii different from the partition wall 4koi forming the boundary between the outer peripheral part segment 4so and the inner side segment 4si. In the planar illumination device 1F according to the present embodiment, the height of the partition wall 4koi forming the boundary between the outer peripheral part segment 4so and the inner side segment 4si is lower than the height of the other partition walls 4kii by ΔH (for example, 1 mm to 2 mm). Note that the configuration along the longitudinal direction has been described above, the same applies to the configuration along the lateral direction.

The partition walls 4koi forming the boundaries between the outer peripheral part segments 4so and the inner side segments 4si are formed line-symmetrically with respect to the center line of the reflector 4F in the longitudinal direction and formed line-symmetrically with respect to the center line of the reflector 4F in the lateral direction.

In the planar illumination device 1F according to the present embodiment, the height 4koiH of the partition wall 4koi forming the boundary between the outer peripheral part segment 4so and the inner side segment 4si is lower than the height 4kiiH of the other partition walls 4kii different from the partition wall 4koi forming the boundary between the outer peripheral part segment 4so and the inner side segment 4si. Thus, light emitted from the light source 30 of the inner side segment 4si adjacently located at the inner side of the outer peripheral part segment 4so in the longitudinal direction and the lateral direction enters into the corresponding outer peripheral part segment 4so, and the light is emitted from the emission surface R of the outer peripheral part segment 4so. As a result, the planar illumination device 1F according to the present embodiment can increase the amount of light emitted from the emission surface R of the outer peripheral part segment 4so, and thus can further uniformize the luminance at the emission surface R.

The planar illumination device 1F illustrated in FIG. 24 has been described such that, in the outer peripheral part segment 4so, the height of the substrate side reflection surface 4fxod located at the outer side from the substrate 3F is the same as the height of the substrate side reflection surface 4fxid located at the inner side from the substrate 3F. However, the planar illumination device 1F according to the present embodiment is not limited to this and, in the outer peripheral part segment 4so, the height of the substrate side reflection surface 4fxod located at the outer side from the substrate 3F may be different from the height of the substrate side reflection surface 4fxid located at the inner side from the substrate 3F. In addition, although not illustrated, the same applies to the lateral direction.

First Modification Example of Fourth Embodiment

In the planar illumination device 1F according to the fourth embodiment described above, the areas of the segments 4s are the same and the areas of the second openings 402 of the segments 4s are the same. However, the planar illumination device 1F according to the present embodiment is not limited to this. For example, as in the planar illumination device 1C according to the second modification example of the second embodiment, in the first modification example of the planar illumination device 1F according to the fourth embodiment, the area of the second opening 402 of the outer peripheral part segment 4so may be smaller than the area of the second opening 402 of the inner side segment 4si.

Figure 25:
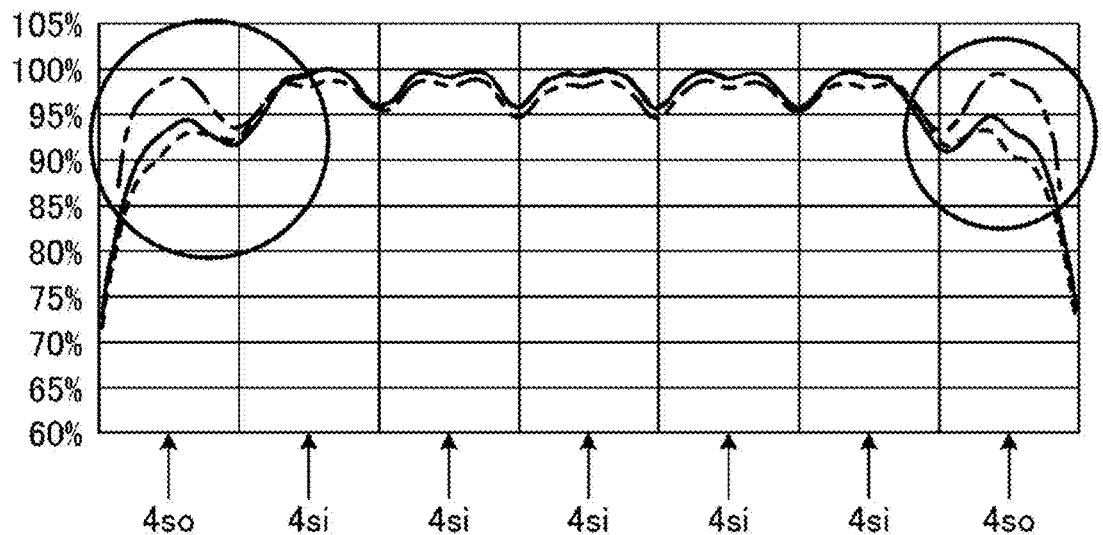
FIG. 25 is a graph comparing the uniformity of luminance in the planar illumination device of the first embodiment and the uniformity of luminance in a planar illumination device of a first modification example of the fourth embodiment in a cross section including a longitudinal direction and passing through optical axes of light sources.
Figure 26:
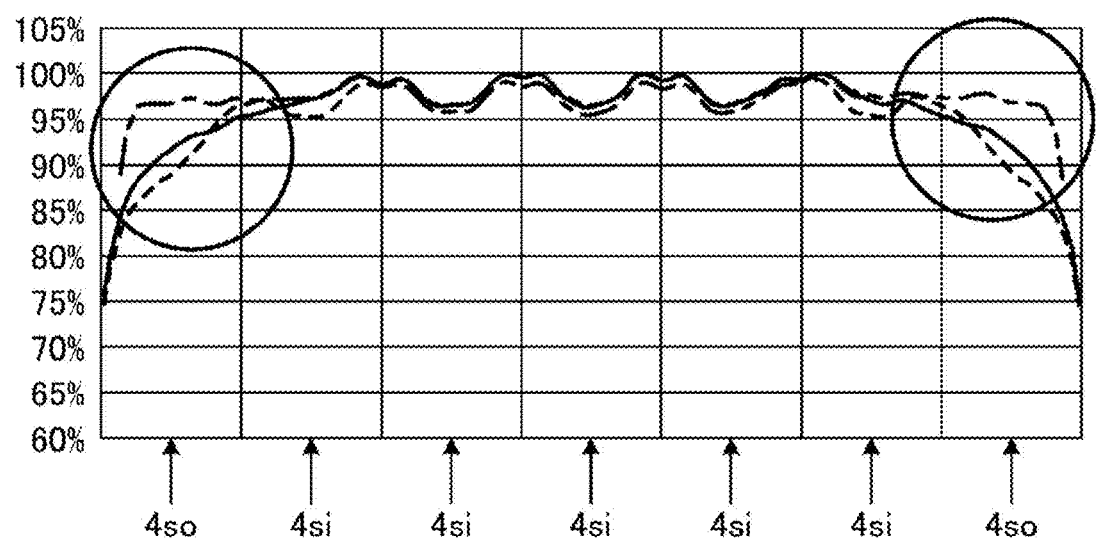
FIG. 26 is a graph comparing the uniformity of luminance in the planar illumination device of the first embodiment and the uniformity of luminance in the planar illumination device of the first modification example of the fourth embodiment in a cross section including a longitudinal direction and along ridge lines of wall portions.

A test apparatus having the same configuration as the planar illumination device according to the above-described first modification example was made, and the uniformity of luminance at the emission surface R was evaluated as follows. More specifically, FIGS. 25 and 26 show graphs comparing the uniformity of luminance between the planar illumination device having the configuration of the above-described first modification example of the fourth embodiment including seven segments 4s in each of the longitudinal direction and the lateral direction, the planar illumination device 1F having the configuration of the fourth embodiment including seven segments 4s in each of the longitudinal direction and the lateral direction, and the planar illumination device 1 having the configuration of the first embodiment including seven segments 4s in each of the longitudinal direction and the lateral direction. FIG. 25 is a graph comparing the uniformity of luminance in the planar illumination device 1 of the first embodiment and the uniformity of luminance in the planar illumination device of the first modification example of the fourth embodiment in a cross section including the longitudinal direction and passing through the optical axes 30j of the light sources 30 (that is, a cross section passing through the center parts of the segments). FIG. 26 is a graph comparing the uniformity of luminance in the planar illumination device 1 of the first embodiment and the uniformity of luminance in the planar illumination device of the first modification example of the fourth embodiment in a cross section including the longitudinal direction and along the ridge line 40kr of the wall portion 40k (that is, a cross section passing through the ridge lines kr (in other words, a cross section passing through boundary parts between the segments)). In FIGS. 25 and 26, the dash-dotted line indicates the luminance of the planar illumination device according to the first modification example of the fourth embodiment, the solid line indicates the luminance of the planar illumination device 1F according to the fourth embodiment, and the broken line indicates the luminance of the planar illumination device 1 according to the first embodiment.

In the planar illumination device according to the first modification example of the fourth embodiment, the area of the second opening 402 of the outer peripheral part segment 4so is smaller and the amount of light per unit area can be increased, and thus the luminance at the entire outer peripheral part segments 4so (portions encircled in FIGS. 25 and 26) can be increased as compared to the planar illumination device 1 according to the first embodiment and the planar illumination device 1F according to the fourth embodiment. Accordingly, the planar illumination device according to the first modification example of the fourth embodiment can further uniformize the luminance at the emission surface R.

The reflection surface 4fF of the planar illumination device 1F according to the fourth embodiment described above includes two reflection surfaces, i.e., the substrate side reflection surface and the emission surface side reflection surface. However, the reflection surface 4fF of the planar illumination device 1F according to the present embodiment is not limited to this, and for example, at least one reflection surface out of a reflection surface at an outer side and a reflection surface at an inner side may include only the emission surface side reflection surface having a constant intersection angle with respect to the substrate 3.

The planar illumination device 1 according to the first embodiment of the disclosure, the planar illumination devices 1A, 1B, and 1C according to the second embodiment, the planar illumination devices 1D and 1E according to the third embodiment, and the planar illumination device 1F according to the fourth embodiment have been described above. However, the disclosure is not limited to the above-described embodiments, and various modifications can be made without departing from the gist of the disclosure.

Further, the disclosure is not limited by the above-described embodiments. Configurations obtained by appropriately combining the constituent elements of each embodiment described above and the constituent elements of each modification example described above are also included in the disclosure. Further effects and modification examples can be easily derived by a person skilled in the art. Thus, a wide range of aspects of the disclosure is not limited to the embodiments described above and may be modified variously.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims

The invention claimed is:

1. A planar illumination device comprising:
   a substrate including a plurality of light sources provided at one surface side; and
   a reflector disposed at the one surface side of the substrate and including a plurality of segments, each segment of the plurality of segments being corresponding to a respective light source of the plurality of light sources and being formed with a reflection surface surrounding the respective light source, wherein
   in an outer peripheral part segment, of the plurality of segments, located at an outer peripheral part of the reflector, the reflection surface at an outer side and the reflection surface at an inner side are asymmetric, and
   the reflection surface at the outer side and the reflection surface at the inner side each includes one or more different number of reflection surfaces, and the number of reflection surfaces is defined by difference in intersection angles to the substrate in a thickness direction.

2. The planar illumination device according to claim 1, wherein, in the outer peripheral part segment, an intersection angle between one of the reflection surface at the outer side and the reflection surface at the inner side and the substrate is larger than an intersection angle between the other reflection surface and the substrate.

3. The planar illumination device according to claim 1 wherein a distance from one of the reflection surface at the outer side and the reflection surface at the inner side to a light source, of the plurality of light sources, disposed at the outer peripheral part segment is different than a distance from the other reflection surface to the light source at an opening of the reflector at a substrate side.

4. The planar illumination device according to claim 2, wherein the other reflection surface includes a substrate side reflection surface formed at the substrate side and an emission surface side reflection surface formed at an emission surface side,
   the intersection angle between the one reflection surface and the substrate is larger than an intersection angle between the substrate side reflection surface and the substrate, and
   an intersection angle between the emission surface side reflection surface and the substrate is larger than the intersection angle between the substrate side reflection surface and the substrate.

5. The planar illumination device according to claim 1, wherein
   the reflection surface includes a substrate side reflection surface formed at the substrate side and an emission surface side reflection surface formed at an emission surface side, and
   an intersection angle between the emission surface side reflection surface and the substrate is larger than an intersection angle between the substrate side reflection surface and the substrate.

6. The planar illumination device according to claim 5, wherein the intersection angle between the emission surface side reflection surface and the substrate is 50 to 75 degrees, and
   the intersection angle between the substrate side reflection surface and the substrate is 15 to 50 degrees.

7. The planar illumination device according to claim 1, wherein the light sources exhibit a light distribution with a larger amount of light in a direction inclined from an optical axis than an amount of light in a direction of the optical axis.

8. The planar illumination device according to claim 1, wherein in the outer peripheral part segment, one of the reflection surface at the outer side and the reflection surface at the inner side comprises a single stage while the other reflection surface comprises two stages.

9. The planar illumination device according to claim 1, wherein in a cross section including optical axes of the plurality of light sources, a length of the emission surface side reflection surface is longer than or equal to a length of the substrate side reflection surface.

10. The planar illumination device according to claim 1, wherein an area of an emission surface side opening of the outer peripheral part segment is smaller than an area of an emission surface side opening of an inner side segment located at an inner side of the outer peripheral part segment.

11. The planar illumination device according to claim 1, wherein in the outer peripheral part segment, the reflection surface at the inner side comprises two stages and the reflection surface at the outer side comprises a single stage.

12. The planar illumination device according to claim 1, wherein in the outer peripheral part segment, the reflection surface at the outer side comprises two stages and the reflection surface at the inner side comprises a single stage.

13. A planar illumination device comprising:
- a substrate including a plurality of light sources provided at one surface side; and
- a reflector disposed at the one surface side of the substrate and including a plurality of segments, each segment of the plurality of segments being corresponding to a respective light source of the plurality of light sources and being formed with a reflection surface surrounding the respective light sources, wherein
- the plurality of segments include an outer peripheral part segment disposed at an outer peripheral part of the reflector and an inner side segment disposed at an inner side of the outer peripheral part segment,
- a height of a partition wall of the reflector forming a boundary between the outer peripheral part segment and the inner side segment is lower than a height of another partition wall, and
- a height of a wall forming an outer peripheral edge of the reflector is higher than the partition wall of the reflector forming the boundary between the outer peripheral part segment and the inner side segment.

14. The planar illumination device according to claim 13, wherein an area of an emission surface side opening of the outer peripheral part segment is smaller than an area of an emission surface side opening of an inner side segment located at an inner side of the outer peripheral part segment.

15. The planar illumination device according to claim 13, wherein in the outer peripheral part segment, the reflection surface at the inner side comprises two stages and the reflection surface at the outer side comprises a single stage.

16. The planar illumination device according to claim 13, wherein in the outer peripheral part segment, the reflection surface at the outer side comprises two stages and the reflection surface at the inner side comprises a single stage.

* * * * *